(12) United States Patent
Sugiyama

(10) Patent No.: US 9,640,130 B2
(45) Date of Patent: May 2, 2017

(54) DISPLAY DRIVER AND DISPLAY DEVICE

(71) Applicant: Synaptics Japan GK, Tokyo (JP)

(72) Inventor: Kimihiko Sugiyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 14/470,971

(22) Filed: Aug. 28, 2014

(65) Prior Publication Data

US 2015/0061985 A1 Mar. 5, 2015

(30) Foreign Application Priority Data

Aug. 28, 2013 (JP) .................................. 2013-176540

(51) Int. Cl.
  *G09G 3/36* (2006.01)
  *G06F 3/044* (2006.01)
(52) U.S. Cl.
  CPC ........... *G09G 3/3696* (2013.01); *G06F 3/044* (2013.01); *G09G 3/3677* (2013.01); *G06F 2203/04112* (2013.01); *G09G 2320/0223* (2013.01); *G09G 2320/0233* (2013.01)
(58) Field of Classification Search
  CPC ...... G06F 3/03; G09G 3/3677; G09G 3/3696; G09G 2320/0233; G09G 2320/0223
  USPC ............................................ 345/87, 173, 174
  See application file for complete search history.

(56) References Cited

U.S. PATENT DOCUMENTS

2004/0070579 A1* 4/2004 Kurihara .............. G09G 3/2011
   345/204
2006/0007202 A1 1/2006 Satoh et al.
2006/0227082 A1* 10/2006 Ogata .................. G09G 3/3291
   345/76
2008/0074404 A1 3/2008 Sashida
2008/0111773 A1* 5/2008 Tsuge .................. G09G 3/3241
   345/76
2011/0291976 A1* 12/2011 Takada .................... G06F 3/016
   345/173
2012/0098801 A1 4/2012 Mizoguchi
2014/0092082 A1* 4/2014 Choi .................... G09G 3/3696
   345/213

FOREIGN PATENT DOCUMENTS

| JP | 2005-345752 A | 12/2005 |
| JP | 2008-077005 A | 4/2008 |
| JP | 2009-163255 A | 7/2009 |
| JP | 2012-088550 A | 5/2012 |

* cited by examiner

*Primary Examiner* — Towfiq Elahi
(74) *Attorney, Agent, or Firm* — Miles & Stockbridge P.C.

(57) ABSTRACT

A display driver is connectable with and serves to activate an active matrix type display panel having a plurality of source lines wired to run in an up-and-down direction and a plurality of gate lines wired to run in left and right directions when viewed from a direction perpendicular to a substrate, and a plurality of pixels respectively arranged at intersections where the source and gate lines intersect with one another; electric charges corresponding to display data are transmitted from the source lines to the pixels selected by the driven gate line. The display driver includes a circuit capable of adjusting, in amplitude, first gate drive circuits operable to drive, of the plurality of gate lines, gate lines wired from the left, and second gate drive circuits operable to drive gate lines wired from the right independently of one another.

30 Claims, 16 Drawing Sheets

| SW | RESISTANCE-SELECT VALUE, RaΣ |
|---|---|
| 7 | Ra0 × 7 |
| 6 | Ra0 × 6 |
| 5 | Ra0 × 5 |
| 4 | Ra0 × 4 |
| 3 | Ra0 × 3 |
| 2 | Ra0 × 2 |
| 1 | Ra0 × 1 |
| 0 | 0 |

Fig.5

| SW2 | SW1 | SW0 | RESISTANCE-SELECT VALUE, RaΣ |
|---|---|---|---|
| OFF | OFF | OFF | Ra0 × 7 |
| OFF | OFF | ON | Ra0 × 6 |
| OFF | ON | OFF | Ra0 × 5 |
| OFF | ON | ON | Ra0 × 4 |
| ON | OFF | OFF | Ra0 × 3 |
| ON | OFF | ON | Ra0 × 2 |
| ON | ON | OFF | Ra0 × 1 |
| ON | ON | ON | 0 |

DISPLAY DRIVER AND DISPLAY DEVICE

CROSS-REFERENCE TO RELATED APPLICATIONS

The Present application claims priority from Japanese application JP 2013-176540 filed on Aug. 28, 2013, the content of which is hereby incorporated by reference into this application.

BACKGROUND

The present invention relates to a display driver and a display device, and particularly to a circuit which can be suitably used for driving gate lines of an active matrix type display panel.

In regard to display devices including liquid crystal display (LCD: Liquid Crystal Display) device, the upsizing of display panels, and the rise in definition to a higher level are proceeding. In many cases, active matrix type display panels are adopted for such display devices. An active matrix type display panel has source lines and gate lines which are arranged to intersect with one another; one pixel is disposed at each intersection. Electric charges corresponding to display data are transmitted from the source lines to the pixels selected by the activated gate lines; the brightness to be displayed by each of the pixels depends on the charge transmitted to the pixel. With the upsizing of display panels and the rise in definition to a higher level, the problem of the unevenness such as the inclination of brightness to be displayed in a display plane come to the surface.

The Japanese Unexamined Patent Application Publication No. JP-A-2005-345752 has disclosed an image display device which compensates a drop in voltage arising on the internal resistance of a switch inside a scan line (gate line) control circuit to reduce the drop in brightness. JP-A-2008-77005 and JP-A-2009-163255 each have disclosed a display driver which corrects the difference in voltage drop in each row of gradation signals output by a source driver by changing a scan signal voltage to be applied to a scan line (gate line) involved by the row. JP-A-2012-88550 has disclosed an image display device which can suppress the unevenness of brightness stemming from line resistances and line capacitances of vertical lines (source lines). If a horizontal line (gate line) is selected and activated, in synchronization with this, the resistance between a vertical line and its drive circuit is changed according to the position of the selected horizontal line.

The inventor examined the following patent documents prior to the invention hereof: JP-A-2005-345752; JP-A-2008-77005; JP-A-2009-163255; and JP-A-2012-88550.

SUMMARY

After the examination on JP-A-2005-345752, JP-A-2008-77005, JP-A-2009-163255, and JP-A-2012-88550, the inventor found problems as described below.

In regard to display panels, it tends to be demanded to reduce the frame size as well. So, gate lines may be arranged alternately one by one to extend from the right and the left, and gate line drive circuits may be disposed on the right and the left respectively. In such a case, a group of gate lines wired and driven from the right is different, in wired path, from a group of gate lines wired and driven from the left. Therefore, it has been found that the groups of gate lines can vary in line resistance and the line capacitance. In addition, it has been known that there is a display panel arranged so that groups of gate lines wired from the right and the left respectively are formed by different wiring materials in different wiring layers. Such a display panel has been found to have the problem that gate lines are allocated alternately one by one to the right and left groups and as such, they vary in line resistance and the line capacitance from line to line, which causes variations in the degree of drop in brightness.

In any of JP-A-2005-345752, JP-A-2008-77005, JP-A-2009-163255, and JP-A-2012-88550, there is no description nor suggestion concerning the problem. Especially, as described in JP-A-2008-77005 and JP-A-2009-163255, this problem cannot be solved by a method for making a correction on each region according to the distance from the source driver. In JP-A-2005-345752, FIG. 6 shows voltage distribution curves in the right- and left-side driving cases with respect to horizontal positions; the phenomenon that the amplitude attenuates further at a position farther away from the drive circuit is just shown therein. There is no description nor suggestion about the significant difference between the line wired from the right and the line wired from the left in the line resistance or line capacitance.

Therefore, it is an object of the invention to reduce the unevenness of brightness in a display driver operable to activate an active matrix type display panel which is attributed to the difference between right and left wired paths from gate drive circuits for gate lines and/or the difference between wiring layers.

While the means for solving the problems will be described below, other problems and novel features will become apparent from the description hereof and the accompanying drawings.

One embodiment of the invention is as described below.

A display driver is connectable with a display panel having a plurality of source lines wired to run in an up-and-down direction and a plurality of gate lines wired to run in left and right directions when viewed from a direction perpendicular to a substrate, and a plurality of pixels respectively arranged at intersections where the source and gate lines intersect with one another, in which electric charges corresponding to display data are transmitted from the source lines to the pixels selected by the driven gate line. The display driver includes: a circuit capable of adjusting, in output amplitude, a group of first gate drive circuits operable to drive, of the plurality of gate lines, the gate lines wired from the left, and a group of second gate drive circuits operable to drive the gate lines wired from the right, independently of one another.

The effect brought about by the embodiment described above will be briefly described below.

It is possible to reduce the unevenness of brightness in a display driver operable to activate an active matrix type display panel which is attributed to the difference between right and left wired paths from gate drive circuits for gate lines and/or the difference between wiring layers.

BRIEF DESCRIPTION OF THE DRAWINGS

FIG. 5 is a diagram showing a truth table which represents the action of the output-amplitude-adjustment circuit shown in FIG. 4;

DETAILED DESCRIPTION

1. Summary of the Embodiments

Figure 1:
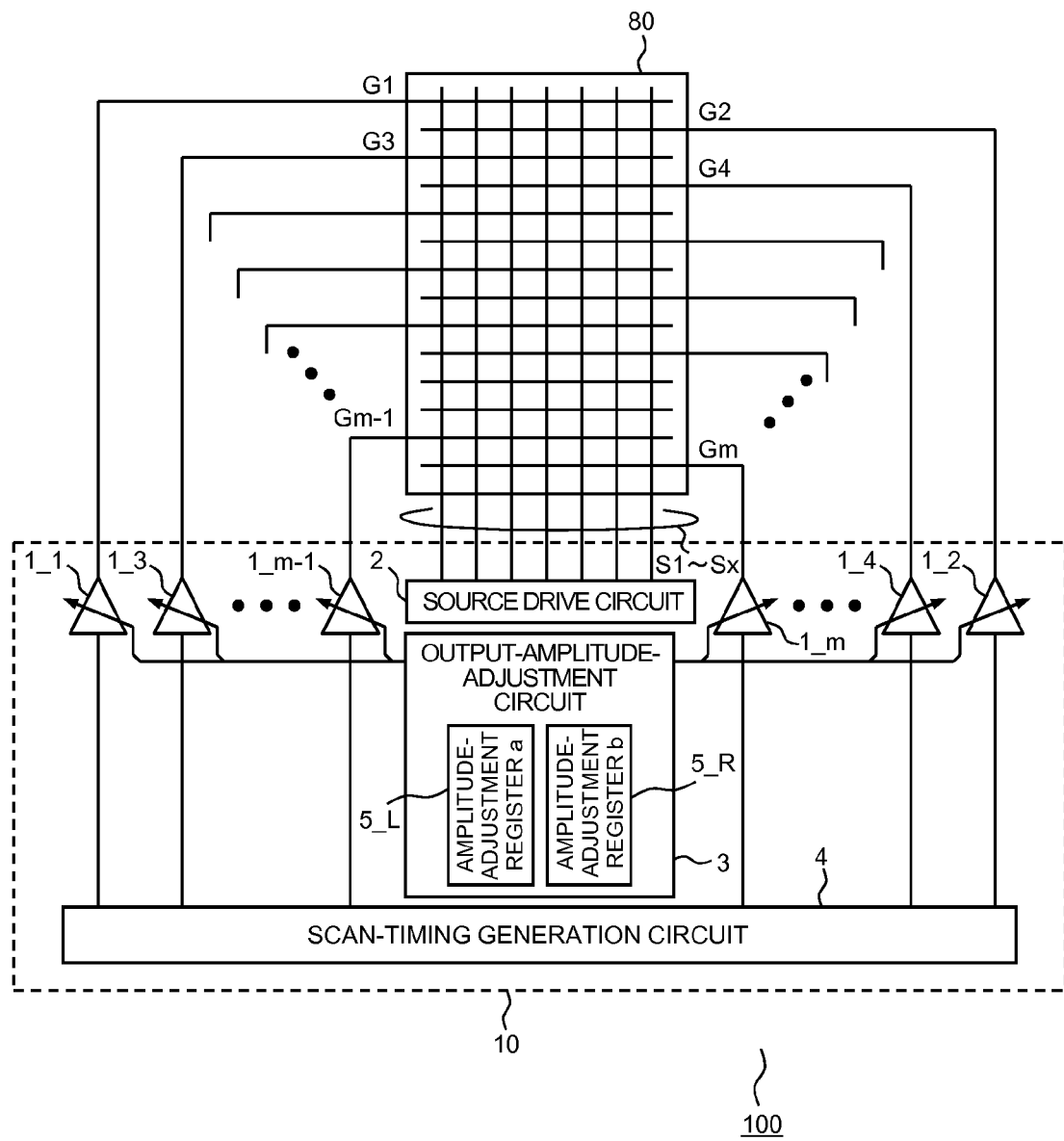
FIG. 1 is a block diagram showing the configuration of a display device and a display driver according to the first embodiment.

First, summary of representative embodiments of the invention disclosed in the application will be described. Reference numerals in drawings in parentheses referred to in description of the summary of the representative embodiments just denote components included in the concept of the components to which the reference numerals are designated.

[1] <Circuit Operable to Adjust the Output Amplitudes of the Right and Left Gate Drive Circuits Left and Right Independently>

The display driver according to a representative embodiment herein disclosed is a display driver (10) connectable with a display panel (80) and arranged as follows.

The display panel has a plurality of source lines (S1-Sx) wired to run in an up-and-down direction and a plurality of gate lines (G1-Gm) wired to run in left and right directions when viewed from a direction perpendicular to a substrate, and a plurality of pixels respectively arranged at intersections where the source and gate lines intersect with one another, and electric charges corresponding to display data are transmitted from the source lines to the pixels selected by the driven gate line.

The display driver includes an output-amplitude-adjustment circuit (3) capable of adjusting, in output amplitude, a group of first gate drive circuits (1_1, 1_3, . . . 1_m-1) operable to drive, of the plurality of gate lines, a group of first gate lines (G1, G3, . . . Gm-1) wired from the left, and a group of second gate drive circuits ($1_{13}$ 2, 1_4, . . . 1_m) operable to drive a group of second gate lines (G2, G4, . . . Gm) wired from the right, independently of one another.

According to the embodiment, it is possible to reduce the unevenness of brightness in a display driver operable to activate an active matrix type display panel which is attributed to the difference between right and left wired paths from gate drive circuits for gate lines and/or the difference between wiring layers.

[2] <Adjustment of the Output Amplitude According to the Wiring Length to the Gate Line to be Driven>

In the display driver as described in [1], the output-amplitude-adjustment circuit makes the output amplitude of the first gate drive circuit (1_1, for example) longer in wiring length to the first gate line to be driven in the group of first gate drive circuits larger than that of the first gate drive circuit (1_m-1, for example) shorter in wiring length to the first gate line to be driven. Further, the output-amplitude-adjustment circuit makes the output amplitude of the second gate drive circuit (1_2, for example) longer in wiring length to the second gate line to be driven in the group of second gate drive circuits larger than that of the second gate drive circuit (1_m, for example) shorter in wiring length to the second gate line to be driven.

According to the embodiment like this, the output amplitude of the gate drive circuits can be adjusted based on the wiring length to the gate line to be driven and therefore, the output amplitude to the gate line of the far end can be made larger than the output amplitude to the gate line of the near end. As a result, the attenuation of signal amplitudes owing to the line resistance and the line capacitance can be compensated, and the resultant unevenness of brightness can be reduced further.

[3] <Stepwise Adjustment of the Output Amplitude to the Gate Lines of the Near End to the Far End>

In the display driver as described in [2], the output-amplitude-adjustment circuit is capable of adjusting, based on the wiring length to the first gate line to be driven, the output amplitude of first gate drive circuits included in each of sub-groups which the group of first gate drive circuits are divided into to have a value based on the wiring length, and capable of adjusting, based on the wiring length to the second gate line to be driven, the output amplitude of second gate drive circuits included in each of sub-groups which the group of second gate drive circuits are divided into to have a value based on the wiring length (FIGS. 6, 7 to 10, and 12).

According to the embodiment like this, the output amplitude of the gate drive circuits can be stepwise adjusted from the near end to the far end based on the wiring length to the gate line to be driven, and thus the resultant unevenness of brightness can be reduced.

[4] <Successive Adjustment of the Output Amplitude to the Gate Lines of the Near End to the Far End>

Figure 6:
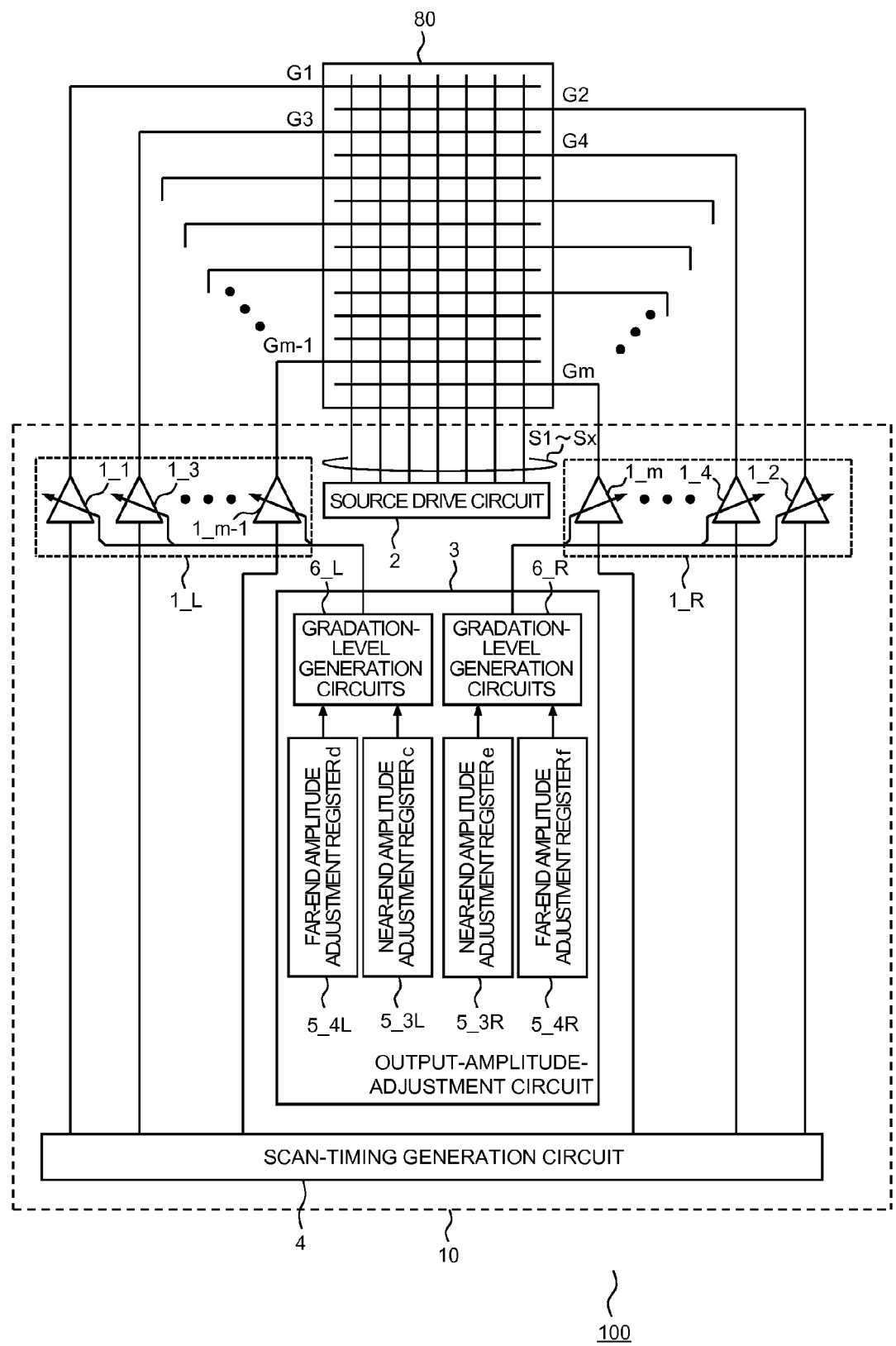
FIG. 6 is a block diagram showing the configuration of a display device and a display driver according to the third embodiment.
Figure 11:
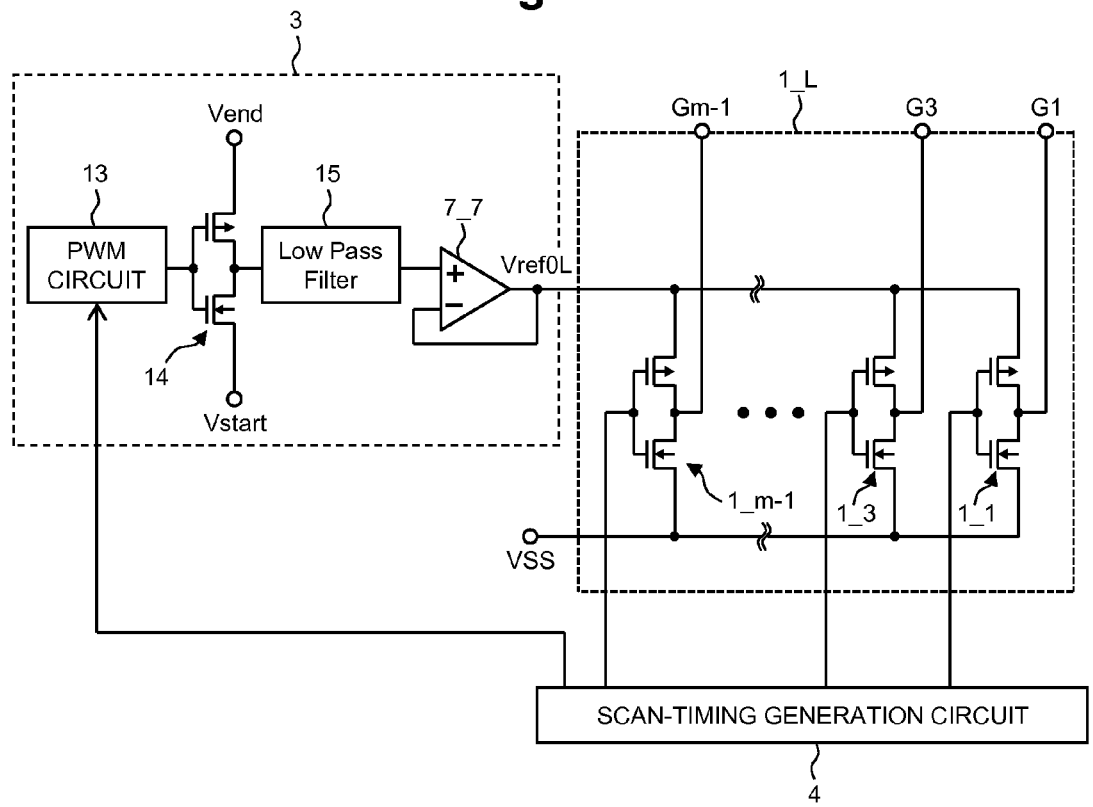
FIG. 11 is a circuit diagram showing the fifth example of the configuration of the output-amplitude-adjustment circuit.
Figure 13:
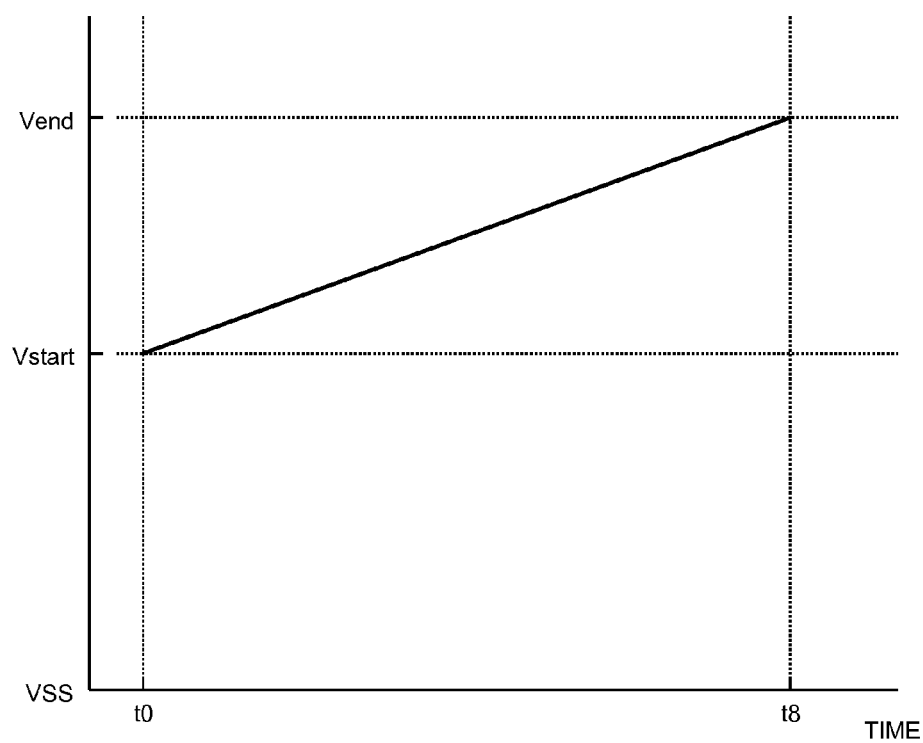
FIG. 13 is a waveform diagram showing the action of the output-amplitude-adjustment circuit of the fifth example of the configuration.

In the display driver as described in [2], the output-amplitude-adjustment circuit is capable of successively adjusting the output amplitude of a first gate drive circuit included in the group of first gate drive circuits based on the wiring length to the first gate line to be driven, and capable of successively adjusting the output amplitude of a second gate drive circuit included in the group of second gate drive circuits based on the wiring length to the second gate line to be driven (FIGS. 6, 11, 13).

According to the embodiment like this, the output amplitude of the gate drive circuit can be successively adjusted from the near end to the far end based on the wiring length to the gate line to be driven, whereby the resultant unevenness of brightness can be reduced.

[5] <Adjustment of a Power Source to be Supplied to Gate Drive Circuits Mounted on the Display Panel>

In the display driver as described in [1], the group of first gate drive circuits (82_L) and the group of second gate drive circuits (82_R) are mounted on the display panel (80). The display driver supplies the group of first gate drive circuits with a first power source (GVDD1, GVSS1), and the group of second gate drive circuits with a second power source (GVDD2, GVSS2). The output-amplitude-adjustment circuit is capable of adjusting, in voltage, the first power source and the second power source independently of each other.

According to the embodiment like this, even with a display driver connected with a display panel having built-in gate drive circuits, the unevenness of brightness resulting from the difference between right and left wired paths, and the differences in the line resistance and the line capacitance can be reduced.

[6] <Voltage Adjustment of a Power Source to be Supplied to the Gate Drive Circuit According to the Wiring Length to the Gate Line to be Driven>

In the display driver as described in [5], the output-amplitude-adjustment circuit is capable of adjusting the voltage of the first power source when a first gate line (G1, for example) farther from the display driver is driven to be higher than the voltage of the first power source when a first gate line (Gm-1, for example) closer to the display driver is driven. In addition, the output-amplitude-adjustment circuit is capable of adjusting the voltage of the second power source when a second gate line (G2, for example) farther from the display driver is driven to be higher than the voltage of the second power source when a second gate line (Gm, for example) closer to the display driver is driven.

According to the embodiment like this, even with a display driver connected with a display panel having built-in gate drive circuits, the gate drive circuits can be adjusted in output amplitude based on the total wiring length of the power-source line and signal lines to a gate line to be driven, and the output amplitude to the gate line of the far end can be made larger than the output amplitude to the gate line of the near end. Therefore, the drop of the source voltage in each gate drive circuit owing to the line resistance and the line capacitance of the power-source line, and the attenuation of the signal amplitude of its output owing to the line resistance and the line capacitance of the gate line are both compensated, whereby the resultant unevenness of brightness can be reduced further.

[7] <Self-Auto Compensation Taking Advantage of a Touch Panel Mounted on a Display Panel>

In the display driver as described in [1], the display panel further includes a touch panel (90) laminated on the substrate and having a plurality of touch detection lines (91, 92). The display driver further includes a plurality of receive circuits (93, 94) connected with the plurality of touch detection lines respectively, and each capable of detecting the amplitude of a signal on the corresponding touch detection line.

In the display driver, the output-amplitude-adjustment circuit is capable of adjusting the output amplitude of at least one of the group of first gate drive circuits and the group of second gate drive circuits to make smaller differences between amplitude values of signals detected by the plurality of receive circuits when the group of first gate lines are driven by the group of first gate drive circuits, and amplitude values of signals detected by the plurality of receive circuits when the group of second gate lines are driven by the group of second gate drive circuits.

According to the embodiment like this, with a display driver (10) operable to activate a display panel (80) with a touchpanel (90) laminated thereon, the unevenness of brightness attributed to the difference between right and left wired paths of gate lines, and the difference in wiring layer can be reduced while accommodating each individual characteristics. Further, the display driver may be built in as a self-auto compensation (self-auto calibration) circuit, otherwise the display driver may be arranged so that such compensation means is externally added only at the time of calibration, and a compensation value is held in a non-volatile memory therein.

[8] <Self-Auto Compensation of the Unevenness of Brightness Owing to the Difference in Wiring Length>

In the display driver as described in [7], the output-amplitude-adjustment circuit is capable of adjusting the output amplitude of a first gate drive circuit included in the group of first gate drive circuits to make smaller differences between signal amplitudes detected by the receive circuits when a first gate line (G1, for example) farther from the display driver is driven, and signal amplitudes detected by the receive circuits when a first gate line (Gm-1, for example) closer to the display driver is driven. In addition, the output-amplitude-adjustment circuit is capable of adjusting the output amplitude of a second gate drive circuit included in the group of second gate drive circuits to make smaller differences between signal amplitudes detected by the receive circuits when the second gate line (G2, for example) farther from the display driver is driven, and signal amplitudes detected by the receive circuits when a second gate line (Gm, for example) closer to the display driver is driven.

According to the embodiment like this, the attenuation of signal amplitudes owing to the line resistance and the line capacitance is self-compensated automatically and thus, the resultant unevenness of brightness can be reduced further.

[9] <Measurement of Signal Amplitudes on the Gate Lines by Touch Detection Lines in Parallel with Gate Lines>

In the display driver as described in [7], the plurality of touch detection lines include a group of first touch detection lines (91) wired in an up-and-down direction, and a group of second touch detection lines (92) wired in left and right directions.

In the display driver, the output-amplitude-adjustment circuit is capable of adjusting the output amplitude of at least one of the group of first gate drive circuits and the group of second gate drive circuits to make smaller differences between amplitude values of signals detected by receive circuits (94) connected with the group of second touch detection lines when the group of first gate lines are driven by the group of the first gate drive circuits, and amplitude values of signals detected by the receive circuits (94) connected with the group of second touch detection lines when the group of second gate lines are driven by the group of second gate drive circuits.

According to the embodiment like this, the sensitivity of detection of signal amplitudes on the gate lines by the touch detection lines can be increased.

[10] <HiZ Driving of a Source Line in Measuring a Signal Amplitude on a Gate Line>

The display driver as described in [9] further includes a plurality of source drive circuits (2) operable to drive the plurality of source lines respectively. In the display driver, the plurality of source drive circuits are capable of exercising control so as to make the plurality of source lines (S1-Sx) high impedance when the group of first gate lines are driven by the group of first gate drive circuits and when the group of second gate lines are driven by the group of second gate drive circuits.

According to the embodiment like this, the sensitivity of detection of signal amplitudes on the gate lines by the touch detection lines can be increased further.

[11] <One-Chip Structure>

In any one of the display drivers as described in [1] to [10], the display driver (10) is integrated on a single semiconductor substrate.

According to the embodiment like this, the area of the mounting of the display driver can be made smaller.

[12] <Display Device Capable of Adjusting Right and Left Gate Drive Circuits in Output Amplitude Left and Right Independently>

The display device according to a representative embodiment herein disclosed is a display device (100) having a display panel (80) and a display driver (10), which is arranged as follows.

The display panel has a plurality of source lines (S1-Sx) wired to run in an up-and-down direction and a plurality of gate lines (G1-Gm) wired to run in left and right directions when viewed from a direction perpendicular to a substrate, and a plurality of pixels respectively arranged at intersections where the source and gate lines intersect with one another. In the display panel, electric charges corresponding to display data are transmitted from the source lines to the pixels selected by the driven gate line.

The display driver includes an output-amplitude-adjustment circuit (3) capable of adjusting, in output amplitude, a group of first gate drive circuits (1_1, 1_3, . . . 1_m-1) operable to drive, of the plurality of gate lines, a group of first gate lines (G1, G3, . . . Gm-1) wired from the left, and a group of second gate drive circuits (1_2, 1_4, . . . 1_m) operable to drive a group of second gate lines (G2, G4, . . . Gm) wired from the right, independently of one another.

According to this embodiment, it is possible to reduce the unevenness of brightness in a display device having an active matrix type display panel and a display driver for activating the display panel which is attributed to the difference between right and left wired paths from gate drive circuits for gate lines and/or the difference between wiring layers.

[13] <Adjustment of Output Amplitude According to the Wiring Length to a Gate Line to be Driven>

In the display device as described in [12], the output-amplitude-adjustment circuit makes the output amplitude of the first gate drive circuit (1_1, for example) longer in wiring length to the first gate line to be driven in the group of first gate drive circuits larger than that of the first gate drive circuit (1_m-1, for example) shorter in wiring length to the first gate line to be driven. In addition, the output-amplitude-adjustment circuit makes the output amplitude of the second gate drive circuit (1_2, for example) longer in wiring length to the second gate line to be driven in the group of second gate drive circuits larger than that of the second gate drive circuit (1_m, for example) shorter in wiring length to the second gate line to be driven.

According to the embodiment like this, the output amplitude of the gate drive circuits can be adjusted based on the wiring length to the gate line to be driven and therefore, the output amplitude to the gate line of the far end can be made larger than the output amplitude to the gate line of the near end. As a result, the attenuation of signal amplitudes owing to the line resistance and the line capacitance can be compensated, and the resultant unevenness of brightness can be reduced further.

[14] <Stepwise Adjustment of the Output Amplitude to the Gate Lines of the Near End to the Far End>

In the display device as described in [13], the output-amplitude-adjustment circuit is capable of adjusting, based on the wiring length to the first gate line to be driven, the output amplitude of first gate drive circuits included in each of sub-groups which the group of first gate drive circuits are divided into to have a value based on the wiring length, and capable of adjusting, based on the wiring length to the second gate line to be driven, the output amplitude of second gate drive circuits included in each of sub-groups which the group of second gate drive circuits are divided into to have a value based on the wiring length (FIGS. 6, 7 to 10, and 12).

According to the embodiment like this, the output amplitude of the gate drive circuits can be stepwise adjusted from the near end to the far end based on the wiring length to the gate line to be driven, and thus the resultant unevenness of brightness can be reduced.

[15] <Successive Adjustment of the Output Amplitude to the Gate Lines of the Near End to the Far End>

In the display device as described in [13], the output-amplitude-adjustment circuit is capable of successively adjusting the output amplitude of a first gate drive circuit included in the group of first gate drive circuits based on the wiring length to the first gate line to be driven, and capable of successively adjusting the output amplitude of a second gate drive circuit included in the group of second gate drive circuits based on the wiring length to the second gate line to be driven (FIGS. 6, 11, 13).

According to the embodiment like this, the output amplitude of the gate drive circuits can be adjusted successively from the near end to the far end based on the wiring length to the gate line to be driven, and thus the resultant unevenness of brightness can be reduced.

[16] <Adjustment of the Power Source to Supply to the Gate Drive Circuits Mounted on the Display Panel>

In the display device as described in [12], the group of first gate drive circuits (82_L) and the group of second gate drive circuits (82_R) are mounted on the display panel, and the display driver supplies the group of first gate drive circuits with a first power source (GVDD1, GVSS1), and the group of second gate drive circuits with a second power source (GVDD2, GVSS2). The output-amplitude-adjustment circuit is capable of adjusting, in voltage, the first power source and the second power source independently of each other.

According to the embodiment like this, even in a display device including a display panel having gate drive circuits therein and a display driver connected therewith, the unevenness of brightness resulting from the difference between right and left wired paths, and the differences in the line resistance and the line capacitance can be reduced.

[17] <Adjustment of Power Source Voltage to be Supplied to a Gate Drive Circuit According to the Wiring Length to a Gate Line to be Driven>

In the display device as described in [16], the output-amplitude-adjustment circuit is capable of adjusting the voltage of the first power source when a first gate line (G1, for example) farther from the display driver is driven to be higher than the voltage of the first power source when a first gate line (Gm-1, for example) closer to the display driver is driven. In addition, the output-amplitude-adjustment circuit is capable of adjusting the voltage of the second power source when a second gate line (G2, for example) farther from the display driver is driven to be higher than the voltage of the second power source when a second gate line (Gm, for example) closer to the display driver is driven.

According to the embodiment like this, even with a display device including a display panel having built-in gate drive circuits and a display driver connected therewith, the gate drive circuits can be adjusted in output amplitude based on the total wiring length of power-source line and signal lines to a gate line to be driven, and the output amplitude to the gate line of the far end can be made larger than the output amplitude to the gate line of the near end. Therefore, the drop of the source voltage in each gate drive circuit owing to the line resistance and the line capacitance of the power-source line, and the attenuation of the signal amplitude of its output owing to the line resistance and the line capacitance of the gate line are both compensated, whereby the resultant unevenness of brightness can be reduced.

[18] <Self-Auto Compensation Taking Advantage of a Touch Panel Mounted on a Display Panel>

The display device as described in [12] further includes a touch panel (90) laminated on the display panel and having a plurality of touch detection lines (91, 92). The display driver further includes a plurality of receive circuits (93, 94) connected with the plurality of touch detection lines respectively, and each capable of detecting the amplitude of a signal on the corresponding touch detection line.

In the display driver, the output-amplitude-adjustment circuit is capable of adjusting the output amplitude of at least one of the group of first gate drive circuits and the group of second gate drive circuits to make smaller differences between amplitude values of signals detected by the plurality of receive circuits when the group of first gate lines are driven by the group of first gate drive circuits, and amplitude values of signals detected by the plurality of receive circuits when the group of second gate lines are driven by the group of second gate drive circuits.

According to the embodiment like this, with a display device (100) including a display panel (80) with a touch panel (90) laminated thereon and a display driver (10) operable to activate the display panel, the unevenness of brightness attributed to the difference between right and left wired paths of gate lines, and the difference in wiring layer can be reduced while accommodating each individual characteristics. Further, the display driver may be built in as a self-auto compensation (self-auto calibration) circuit, otherwise such compensation means may be arranged to be externally added only at the time of calibration and to hold a compensation value in a non-volatile memory in the display device or display driver.

[19] <Self-Auto Compensation of Unevenness of Brightness Owing to the Difference in Wiring Length>

In the display driver as described in [18], the output-amplitude-adjustment circuit is capable of adjusting the output amplitude of a first gate drive circuit included in the group of first gate drive circuits to make smaller differences between signal amplitudes detected by the receive circuits when a first gate line (G1, for example) farther from the display driver is driven, and signal amplitudes detected by the receive circuits when a first gate line (Gm-1, for example) closer to the display driver is driven. In addition, the output-amplitude-adjustment circuit is capable of adjust-ing the output amplitude of a second gate drive circuit included in the group of second gate drive circuits so as to make smaller the differences between signal amplitudes detected by the receive circuits when the second gate line (G2, for example) farther from the display driver is driven, and signal amplitudes detected by the receive circuits when a second gate line (Gm, for example) closer to the display driver is driven.

According to the embodiment like this, the attenuation of signal amplitudes owing to the line resistance and the line capacitance is self-compensated automatically and thus, the resultant unevenness of brightness can be reduced further.

[20] <Measurement of Signal Amplitudes on Gate Lines by Gate Lines and Touch Detection Lines in Parallel Therewith>

In the display device as described in [18], the plurality of touch detection lines include a group of first touch detection lines (91) wired in an up-and-down direction, and a group of second touch detection lines (92) wired in left and right directions.

In the display driver, the output-amplitude-adjustment circuit is capable of adjusting the output amplitude of at least one of the group of first gate drive circuits and the group of second gate drive circuits to make smaller differences between amplitude values of signals detected by receive circuits (94) connected with the group of second touch detection lines when the group of first gate lines are driven by the group of the first gate drive circuits, and amplitude values of signals detected by the receive circuits (94) connected with the group of second touch detection lines when the group of second gate lines are driven by the group of second gate drive circuits.

According to the embodiment like this, the sensitivity of detection of signal amplitudes on the gate lines by the touch detection lines can be increased.

[21] <HiZ Driving of a Source Line in Measuring a Signal Amplitude on a Gate Line>

In the display device as described in [20], the display driver further includes a plurality of source drive circuits (2) operable to drive the plurality of source lines respectively; the plurality of source drive circuits are capable of exercising control so as to make the plurality of source lines (S1-Sx) high impedance when the group of first gate lines are driven by the group of first gate drive circuits and when the group of second gate lines are driven by the group of second gate drive circuits.

According to the embodiment like this, the sensitivity of detection of signal amplitudes on the gate lines by the touch detection lines can be increased further.

2. Further Detailed Description of the Embodiments

The embodiments of the invention will be described further in detail.

First Embodiment

Display Driver Operable to Adjust Right and Left Gate Drive Circuits in Output Amplitudes Independently FIG. 1 is a block diagram showing the configuration of a display device 100 and a display driver 10 according to the first embodiment. The display driver 10 can be connected with an active matrix type display panel 80.

The display panel 80 has a plurality of source lines S1 to Sx and a plurality of gate lines G1 to Gm which intersect with one another, and pixels arranged at intersections of the source and gate lines respectively; the source lines S1 to Sx are wired to run in an up-and-down direction, and the gate lines G1 to Gm are wired to run in left and right directions when viewed from a direction perpendicular to a substrate. In the display panel, electric charges corresponding to display data are transmitted from the source lines to the pixels selected by the driven gate lines respectively.

The display driver 10 includes a plurality of gate drive circuits 1_1, 1_2, 1_3, 1_4, ..., 1_m-1, 1_m, a source drive circuit 2, an output-amplitude-adjustment circuit 3, and a scan-timing generation circuit 4. The gate drive circuits 1_1, 1_2, 1_3, 1_4, ..., 1_m-1, 1_m drive the gate lines G1 to Gm one by one in turn based on a scan-timing signal supplied from the scan-timing generation circuit 4, which is referred to as "scan". The source drive circuit 2 is capable of outputting signal amplitudes corresponding to display data input thereto through an interface (not shown), and drives the source lines S1 to Sx in parallel in synchronization with the scan by the gate drive circuits 1 with signal amplitudes corresponding to display data. Electric charges corresponding, in quantity, to display data are transmitted from the source lines S1 to Sx to the pixels connected with one gate line driven and selected by the gate drive circuit 1 respectively.

The gate drive circuits are divided into: a group of first gate drive circuits 1_1, 1_3, ..., 1_m-1 operable to drive, of the plurality of gate lines, a group of gate lines G1, G3, ..., Gm-1 wired from the left; and a group of second gate drive circuits 1_2, 1_4, ..., 1_m operable to drive a group of gate lines G2, G4, ..., Gm wired from the right. The output-amplitude-adjustment circuit 3 can adjust the group of first gate drive circuits 1_1, 1_3, ..., 1_m-1 and the group of second gate drive circuits 1_2, 1_4, ..., 1_m in output amplitudes independently.

According to the arrangement like this, it is possible to reduce the unevenness of brightness in a display driver 10 operable to activate an active matrix type display panel 80 which is attributed to the difference between right and left wired paths from gate drive circuits for gate lines and/or the difference between wiring layers. Although no special restriction is intended, for instance, the display driver 10 is formed on a single silicon substrate as a single chip IC (Integrated Circuit) by the well-known CMOS (Complementary Metal-Oxide-Semiconductor) semiconductor manufacturing technique, which is flip-chip mounted on the display panel 80, and the gate lines G1 to Gm are formed by wiring layers on the display panel 80. The distances from the position where the display driver 10 is mounted to the gate lines G1 to Gm in a display region depend on the physical size of the display panel 80, and have influences the paths wired from the gate drive circuits 1 for gate lines. The wiring of the gate lines from gate drive circuits can differ between the left and the right in the wiring length and in addition, and the difference between wiring layers in use can cause changes in line resistance and the line capacitance. In the first embodiment of the invention, the output-amplitude-adjustment circuit 3 adjusts the right and left gate drive circuits in output amplitude, whereby the unevenness of brightness attributed to the difference between right and left wired paths from gate drive circuits for gate lines and/or the difference between wiring layers can be reduced. The gate drive circuits 1 can be formed on a substrate of the display panel 80, such as a glass one, by use of TFTs (TFT: Thin Film Transistor) based on LTP (Low-Temperature Poly Silicon) or the like. In this case, the unevenness of brightness can be reduced by compensating the difference in output amplitude between the right and left gate drive circuits which is caused by the difference between right and left wired paths of power-source lines for supply to the gate drive circuits 1 and/or the difference between the wiring layers.

In order to adjust the right and left gate drive circuits in output amplitude independently, the output-amplitude-adjustment circuit 3 may be arranged to have an amplitude-adjustment register a(5_L) and an amplitude-adjustment register b(5_R) which serve to adjust the right and left gate drive circuits respectively in output amplitude. The amplitude-adjustment register a(5_L) and the amplitude-adjustment register b(5_R) may be constituted by volatile registers and arranged so that appropriate values are set thereon in an initialization sequence in response to the power-on or the like. Otherwise, the registers may be constituted by non-volatile storage devices such as fuses or NVMs (Non-Volatile Memories), and the trimming may be performed according to the display panel 80 connected therewith.

Second Embodiment

Output-Amplitude-Adjustment Circuit

Figure 2:
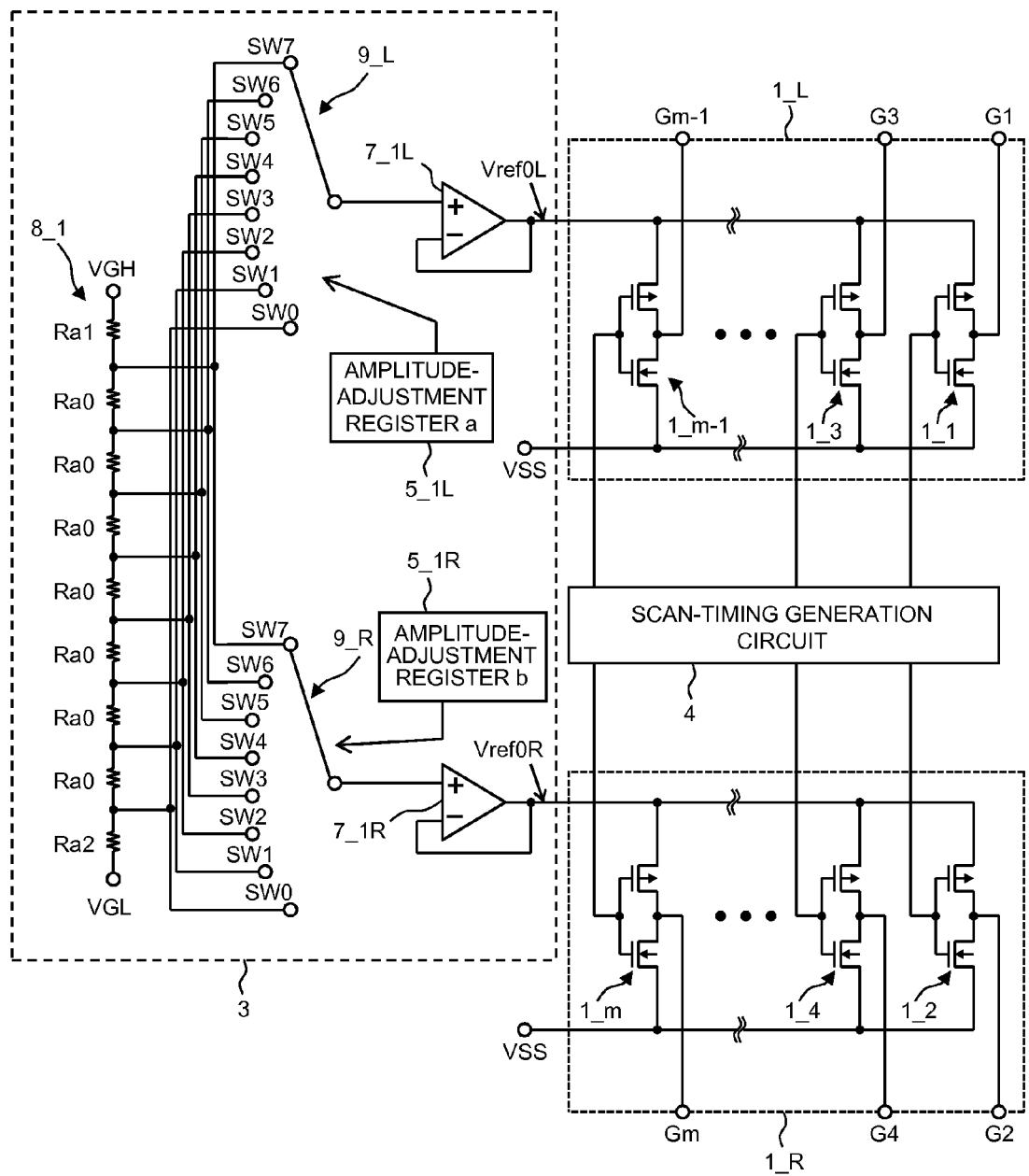
FIG. 2 is a circuit diagram showing an example of the configuration of an output-amplitude-adjustment circuit according to the second embodiment.

FIG. 2 is a circuit diagram showing an example of the configuration of the output-amplitude-adjustment circuit 3 according to the second embodiment. The output-amplitude-adjustment circuit 3 supplies the first gate drive circuit group 1_L(1_1, 1_3, ..., 1_m-1), and the second gate drive circuit group 1_R(1_2, 1_4, ..., 1_m) with power sources Vref0L and Vref0R respectively. The gate drive circuits 1_1, 1_3, ..., 1_m-1 forming the first gate drive circuit group 1_L are composed of CMOS inverters respectively. The gate drive circuits 1_1, 1_3, ..., 1_m-1 are supplied with the power sources Vref0L and VSS, invert and amplify a scan-timing signal supplied from the scan-timing generation circuit 4, and drive the group of gate lines G1, G3, ..., Gm-1. Likewise, the gate drive circuits 1_2, 1_4, ..., 1_m forming the second gate drive circuit group 1_R are composed of CMOS inverters respectively. The gate drive circuits 1_2, 1_4, ..., 1_m are supplied with the power sources Vref0R and VSS, invert and amplify a scan-timing signal supplied from the scan-timing generation circuit 4, and drive the group of gate lines G2, G4, ..., Gm.

The output-amplitude-adjustment circuit 3 includes a resistance ladder 8_1, switches 9_L and 9_R, voltage follower circuits 7_1L and 7_1R, an amplitude-adjustment register a(5_1L), and an amplitude-adjustment register b(5_1R). The resistance ladder 8_1 includes a plurality of resistors connected in series between a high-potential-side power source VGH and a low-potential-side power source VGL, and outputs a gradation voltage from each tap. The resistance ladder 8_1 shown in the drawing has the resistor Ra1 connected with a high-potential-side power source VGH, the resistor Ra2 connected with a low-potential-side power source VGL, and the resistors Ra0 connected in series with one another between the resistors Ra1 and Ra2. The resistance ladder outputs gradation voltages subjected to voltage division by the resistors. The switches 9_L and 9_R serve to select, from gradation voltages thus output, voltages specified by the amplitude-adjustment register a(5_1L) and the amplitude-adjustment register b(5_1R) respectively, and to supply the selected voltages to the voltage follower circuits 7_1L and 7_1R. The voltage follower circuits 7_1L and 7_1R amplify the current and supply the resultant voltages to the gate drive circuits 1 as the power sources respectively. That is, the voltage follower circuits 7_1L and 7_1R supply the first gate drive circuit group 1_L with the power source Vref0L, and the second gate drive circuit group 1_R with the power source Vref0R, respectively. The gate drive circuits 1 forming the first gate drive circuit group 1_L and the second gate drive circuit group 1_R are composed of CMOS inverters, so the output amplitudes become Vref0L and Vref0R with respect to VSS respectively.

Figures 3, 4:
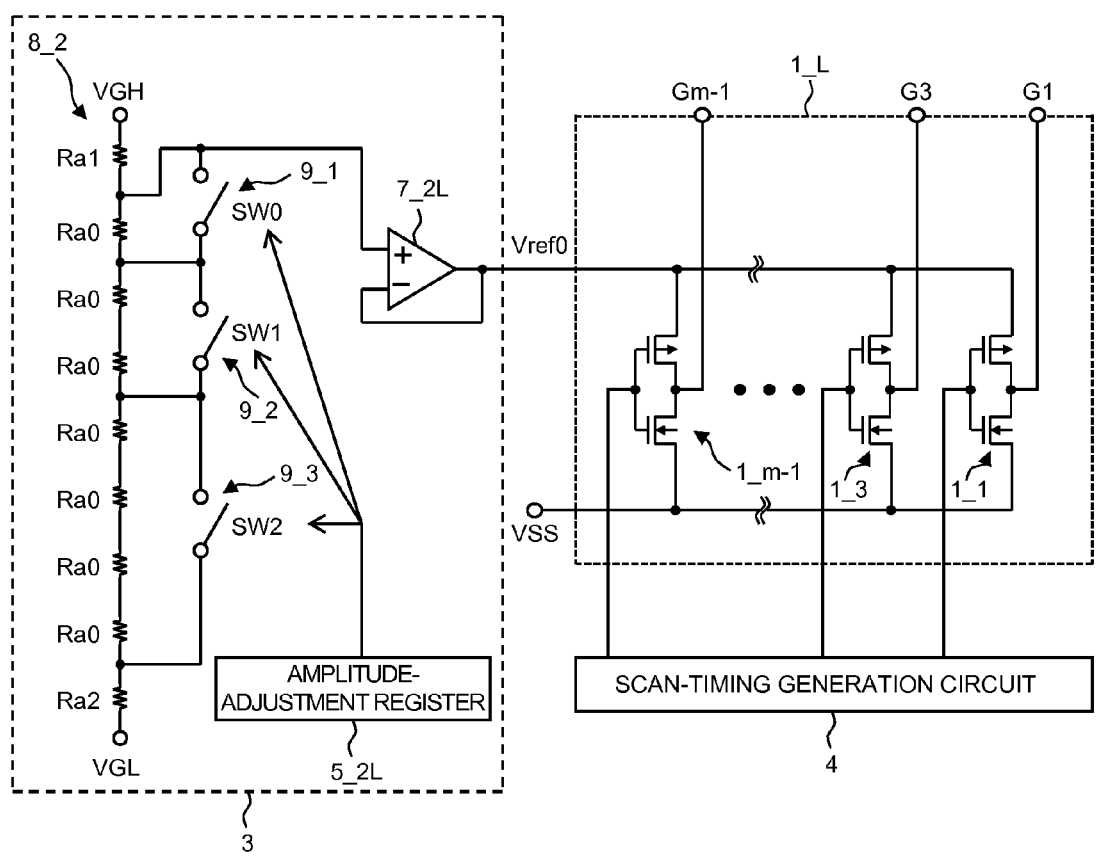
FIG. 3 is a truth table showing the actions of the output-amplitude-adjustment circuit 3 shown in FIG. 2.
FIG. 4 is a circuit diagram showing another example of the configuration of the output-amplitude-adjustment circuit according to the second embodiment.

FIG. 3 is a truth table showing the actions of the output-amplitude-adjustment circuit 3 shown in FIG. 2. The switches 9_L and 9_R perform like actions independently of each other, so they will be described as "switch 9". The switch 9 is a switch which serves to select one contact from eight input contacts SW0 to SW7 and performs an output. The resistance-select value RaΣ is decided as shown in FIG. 3 depending on which contact SW0 to SW7 has been selected, and the gradation voltage Vref0 to be output is selected. The voltage of the gradation voltage Vref0 to be output is calculated according to the formula 1 below.

$$Vref0 = \frac{Ra2 + Ra\Sigma}{Ra1 + Ra2 + 7 \times Ra0} \times (VGH - VGL) + VGL \quad \text{Formula 1}$$

While in the embodiment shown here, the voltage to be output is selected from gradation voltages of eight gradations, the number of gradations can be changed appropriately. Further, while in this embodiment the ladder resistance 8_1 is shared by the left and right drive circuit groups, it is possible to provide one ladder resistance for each of the left and right drive circuit groups. In the case of sharing the ladder resistance by the left and right drive circuit groups, a region (chip area) to form the ladder resistance 8_1 in can be saved. On the other hand, the area for wiring from the ladder resistance 8_1 to the switches 9_L and 9_R can be saved by providing ladder resistances for the left and right drive circuit groups respectively.

FIG. 4 is a circuit diagram showing another example of the configuration of the output-amplitude-adjustment circuit 3 according to the second embodiment. While the left and right circuits are shown in FIG. 2, only the circuits operable to drive the left-wired gate lines are shown in FIG. 4. The circuits operable to drive the right-wired gate lines can be configured in the same way.

The output-amplitude-adjustment circuit 3 supplies the first gate drive circuit group 1_L (1_1, 1_3, . . . , 1_m-1) with the power source Vref0. The gate drive circuits 1_1, 1_3, . . . , 1_m-1 forming the first gate drive circuit group 1_L are composed of CMOS inverters respectively. The gate drive circuits 1_1, 1_3, . . . , 1_m-1 are supplied with the power sources Vref0 and VSS, invert and amplify a scan-timing signal supplied from the scan-timing generation circuit 4, and drive the group of gate lines G1, G3, . . . , Gm-1.

The output-amplitude-adjustment circuit 3 includes a resistance ladder 8_2, switches 9_1, 9_2 and 9_3, a voltage follower circuit 7_2L, and an amplitude-adjustment register a(5_2L). The resistance ladder 8_2 has resistors connected in series between a high-potential-side power source VGH and a low-potential-side power source VGL, and outputs a gradation voltage from each tap. As in the resistance ladder 8_1, the resistance ladder 8_2 shown in the drawing has the resistor Ra1 connected with the high-potential-side power source VGH, and the resistor Ra2 connected with the low-potential-side power source VGL, the resistors Ra0 connected therebetween in series with one another. The resistance ladder outputs gradation voltages subjected to voltage division by the resistors. The switches 9_1, 9_2 and 9_3 each serve to select a voltage specified by the amplitude-adjustment register a(5_2L) from gradation voltages thus output and to supply the selected voltage to the voltage follower circuit 7_2L. The voltage follower circuit 7_2L amplifies the current and supplies the resultant voltage to the first gate drive circuit group 1_L as the power source Vref0. The gate drive circuits 1 forming the first gate drive circuit group 1_L are composed of CMOS inverters respectively, so the output amplitude becomes Vref0 with respect to VSS.

FIG. 5 is a diagram showing a truth table which represents the action of the output-amplitude-adjustment circuit shown in FIG. 4. The resistance-select value RaΣ is decided depending on the combination of ON and OFF of the three switches, namely the switches 9_1, 9_2 and 9_3 as shown in FIG. 5, and thus the gradation voltage Vref0 to be output is selected. The voltage of the gradation voltage Vref0 to be output is calculated according to the formula 2 below.

$$Vref0 = \frac{Ra2 + Ra\Sigma}{Ra1 + Ra2 + Ra\Sigma} \times (VGH - VGL) + VGL \quad \text{Formula 2}$$

While in the embodiment shown here, the voltage to be output is selected from gradation voltages of eight gradations as in the embodiment as described with reference to FIG. 2 and FIG. 3, the number of gradations can be changed appropriately.

The circuit shown in FIG. 2 by example is easier to control the output voltage with high accuracy in comparison to the circuit shown in FIG. 4. This is because the influence of the switch is exerted on the taps evenly, so the accuracy of a ratio is not affected in principle. In addition, the circuit shown in FIG. 4 by example enables the reduction in the circuit scale, and can be arranged to be easier to test. The number of switches is represented by a binary logarithm of the number of gradations (if the number of gradations is denoted by k, the number of switches is "log$_2$ k"), so the number of required switches is small. Further, it is sufficient to directly couple binary signals thereto for the purpose of controlling the switches, and no decoder is needed on condition that the ladder resistance 8_2 cannot be shared by the left and right circuits.

Third Embodiment

Display Driver Operable to Adjust Output Amplitudes of Gate Drive Circuits for the Far End/Near End The display driver 10 is formed in e.g. a display driver IC, which is flip-chip mounted on an edge part of the substrate of the display panel 80, along one side thereof. In this case, a wiring line is laid on the substrate of the display panel 80, running from the position of the display drive IC mounted on the substrate to each gate line. The wiring length varies depending on whether a gate line to be driven is close to or far from the display driver IC and accordingly, the line resistance and line capacitance change. As a result, amplitudes of signals output by gate drive circuits 1 are subjected to different attenuations in quantity. The output amplitude is attenuated more remarkably when reaching the gate line of the far end in comparison to when reaching the gate line of the near end. Hence, previously making the output amplitude of the gate drive circuit 1 operable to drive the gate line of the far end larger than that of the gate drive circuit 1 operable to drive the gate line of the near end, the gate lines of the far end to the near end can be driven by signals uniform in amplitude while compensating the attenuation in quantity.

FIG. 6 is a block diagram showing the configuration of the display device 100 and the display driver 10 according to the third embodiment. As with those shown in FIG. 1, the display driver 10 can be connected with an active matrix type display panel 80, and it includes a plurality of gate drive circuits 1_1, 1_2, 1_3, 1_4, . . . , 1_m-1, 1_m, a source drive circuit 2, an output-amplitude-adjustment circuit 3, and a scan-timing generation circuit 4.

In order to adjust the right and left gate drive circuits in output amplitude independently, the output-amplitude-adjustment circuit 3 includes gradation-level generation circuits 6_L and 6_R independent on each other on the left and right respectively. The output-amplitude-adjustment circuit 3 further includes a near-end amplitude-adjustment register c(5_3L) and a far-end amplitude-adjustment register d(5_4L) which determine the output amplitudes when driving the gate lines located at the near end and the far end on the left respectively, and a near-end amplitude-adjustment register e(5_3R) and a far-end amplitude-adjustment register f(5_4R) which determine the output amplitudes when driving the gate lines located at the near end and the far end on the right respectively. These registers may be composed of volatile registers and arranged so that appropriate values are set thereon in an initialization sequence in response to the power-on or the like as in the case of the amplitude-adjustment register a(5_L) and the amplitude-adjustment register b(5_R). Otherwise, the registers may be constituted by non-volatile storage devices such as fuses or NVMs, and the trimming may be performed according to the display panel 80 connected therewith.

The output-amplitude-adjustment circuit 3 makes the output amplitude of a gate drive circuit (1_1, for example) of the first gate drive circuit group 1_L longer in the wiring length to the gate line to be driven larger than the output amplitude of a gate drive circuit (1_m-1, for example) shorter in the wiring length to the gate line to be driven. For instance, the output-amplitude-adjustment circuit 3 is arranged to be able to adjust the output amplitude of the gate drive circuit 1_1 operable to drive the gate line G1 at the far end by the far-end amplitude-adjustment register d(5_4L), and to adjust the output amplitude of the gate drive circuit 1_m-1 operable to drive the gate line Gm-1 at the near end by the near-end amplitude-adjustment register c(5_3L). Further, the output-amplitude-adjustment circuit 3 makes the output amplitude of a gate drive circuit (1_2, for example) of the second gate drive circuit group 1_R longer in the wiring length to the gate line to be driven larger than the output amplitude of a gate drive circuit (1_m, for example) shorter in the wiring length to the gate line to be driven. For instance, the output-amplitude-adjustment circuit 3 is arranged to be able to adjust the output amplitude of the gate drive circuit 1_2 operable to drive the gate line G2 at the far end by the far-end amplitude-adjustment register f(5_4R), and to adjust the output amplitude of the gate drive circuit 1_m operable to drive the gate line Gm at the near end by the near-end amplitude-adjustment register e(5_3R). The other parts of the configuration and the actions thereof are the same as those described with reference to FIG. 1 and therefore, their descriptions are skipped here.

According to the arrangement like this, the gate drive circuits can be adjusted in output amplitude based on the wiring length to the gate line to be driven, and the output amplitude to the gate line of the far end can be made larger than the output amplitude to the gate line of the near end. Therefore, the attenuation of a signal amplitude owing to the line resistance and the line capacitance can be compensated, thereby further reducing the resultant unevenness of brightness.

The output-amplitude-adjustment circuit 3 can take on various kinds of circuit configuration. Some examples of such configuration will be described below. In the examples of the configuration shown in FIGS. 7 to 11, only the circuits operable to drive the left-wired gate lines are shown as in FIG. 4, whereas in fact, the circuits operable to drive the right-wired gate lines can be also arranged in the same way, the output-amplitude-adjustment circuit 3 can be configured to include the left and right circuits as in FIG. 2.

Figure 7:
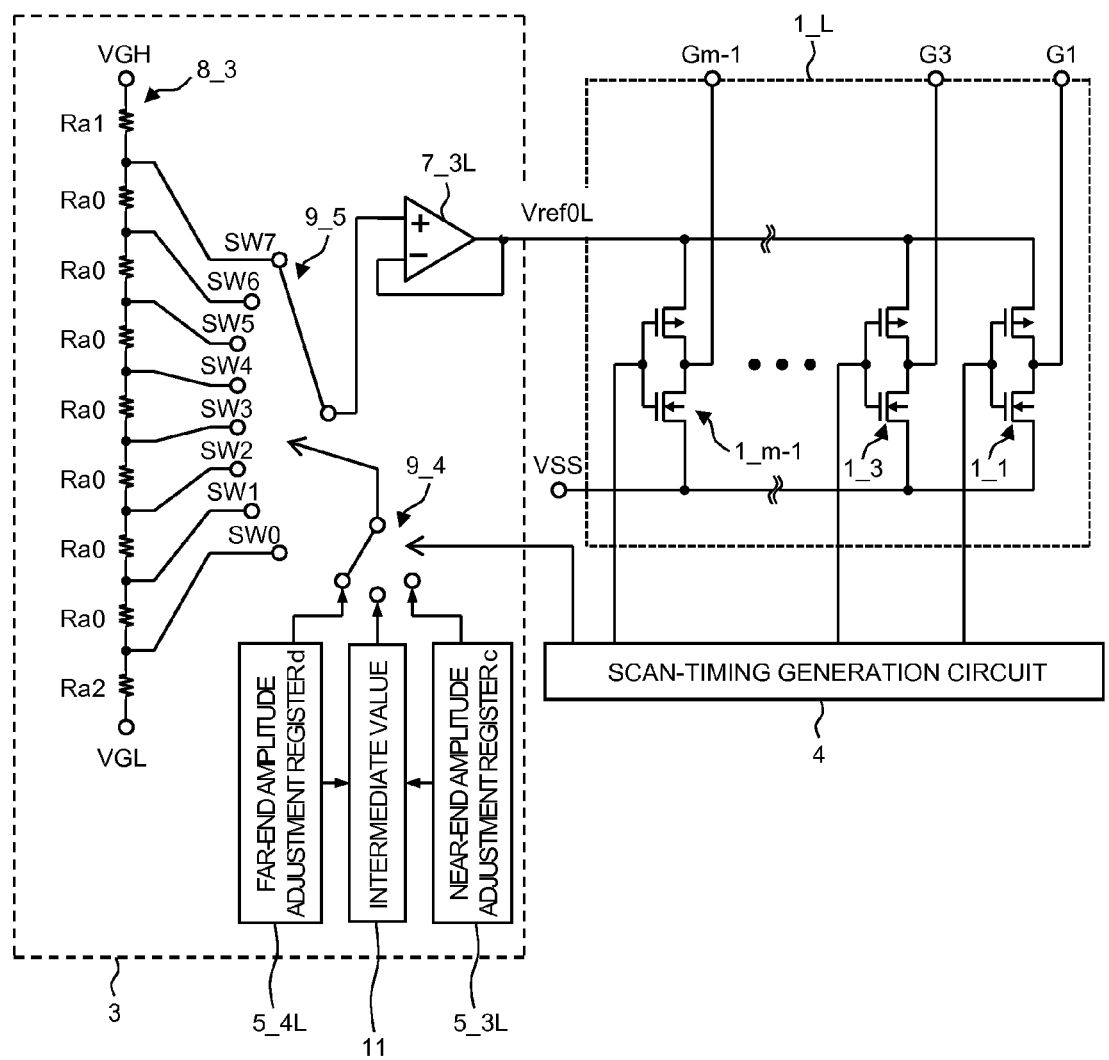
FIG. 7 is a circuit diagram showing the first example of the configuration of an output-amplitude-adjustment circuit according to the third embodiment.

FIG. 7 is a circuit diagram showing the first example of the configuration of the output-amplitude-adjustment circuit 3 according to the third embodiment. The output-amplitude-adjustment circuit 3 supplies the first gate drive circuit group 1_L (1_1, 1_3, . . . , 1_m-1) with a power source Vref0L. The gate drive circuits 1_1, 1_3, . . . , 1_m-1 forming the first gate drive circuit group 1_L are composed of CMOS inverters respectively. The gate drive circuits 1_1, 1_3, . . . , 1_m-1 are supplied with the power sources Vref0 and VSS, invert and amplify a scan-timing signal supplied from the scan-timing generation circuit 4, and drive a group of gate lines G1, G3, . . . , Gm-1.

The output-amplitude-adjustment circuit 3 includes a resistance ladder 8_3, a switch 9_5, a voltage follower circuit 7_3L, a switch 9_4, a near-end amplitude-adjustment register c(5_3L), a far-end amplitude-adjustment register d(5_4L), and a circuit 1_1 operable to calculate an intermediate value of parameters stored in the amplitude-adjustment registers. The resistance ladder 8_3 has a plurality of resistors connected in series between a high-potential-side power source VGH and a low-potential-side power source VGL, and outputs a gradation voltage from each tap. The resistance ladder 8_3 has the resistor Ra1 connected with the high-potential-side power source VGH, and the resistor Ra2 connected with the low-potential-side power source VGL, and the resistors Ra0 connected therebetween in series with one another. The resistance ladder outputs gradation voltages subjected to voltage division by the resistors. The switch 9_5 serves to select a gradation voltage from gradation voltages thus output, and supplies the selected voltage to the voltage follower circuit 7_3L. The voltage follower circuit 7_3L amplifies the current and supplies the power source Vref0L to the first gate drive circuit group 1_L. The gate drive circuits 1 forming the first gate drive circuit group 1_L are composed of CMOS inverters respectively. Therefore, their output amplitudes become Vref0L with respect to VSS.

The scan-timing generation circuit 4 controls the switch 9_4 and supplies the switch 9_5 with an appropriate amplitude-adjustment value in synchronization with the supply of a scan-timing signal to each of the gate drive circuits 1_1 to 1_m-1 of the first gate drive circuit group 1_L. Specifically, the near-end amplitude-adjustment register c(5_3L) is selected by the switch 9_4 in synchronization with the supply of a scan-timing signal to the gate drive circuit 1_m-1 operable to drive the gate line of the near end. The voltage Vref0L based on a parameter stored in the selected near-end amplitude-adjustment register c(5_3L) is selected by the switch 9_5 and supplied to the gate drive circuit 1_m-1 as a source voltage, which makes the output amplitude of a signal for driving the gate line Gm-1. In addition, the far-end amplitude-adjustment register d(5_4L) is selected by the switch 9_4 in synchronization with the supply of a scan-timing signal to the gate drive circuit 1_1 operable to drive the gate line of the far end. The voltage Vref0L based on a parameter stored in the selected far-end amplitude-adjustment register d(5_4L) is selected by the switch 9_5 and supplied to the gate drive circuit 1_1 as a source voltage, which makes the output amplitude of a signal for driving the gate line G1. The intermediate-value-calculation circuit 11 calculates an intermediate value of a parameter stored in the near-end amplitude-adjustment register c(5_3L) and a parameter stored in the far-end amplitude-adjustment register d(5_4L) between the near end and the far end, and supplies the value to the switch 9_5. While the description concerning the configuration of FIG. 7 is based on the assumption that the switch 9_4 is a three-contact switch, the switch may be more finely controlled with four or more contacts by use of the intermediate-value-calculation circuit 11 having a multi-stage outputs. The relation between the output voltage Vref0L and the select sate of the switch 9_5, which is selected based on the near-end amplitude-adjustment register c(5_3L), the far-end amplitude-adjustment register d(5_4L), or an output from the intermediate-value-calculation circuit 11, is determined by the truth table shown in FIG. 3, and the formula 1.

The output-amplitude-adjustment circuit 3 divides the first gate drive circuit group 1_L into some groups according to the wiring lengths to the first gate lines to be driven, and adjusts the output amplitude of a gate drive circuit 1 included in the group concerned to a value based on its wiring length. The output-amplitude-adjustment circuit controls the source voltage stepwise supplied to the first gate drive circuit group 1_L for each group, thereby adjusting the output amplitude for each group. When the gate lines are sequentially scanned from the far end toward the near end, the output amplitude is controlled to stepwise drop sequentially. While the illustration and description are skipped here, the output-amplitude-adjustment circuit 3 is also arranged to fit the second gate drive circuit group 1_R on the right as described concerning the first gate drive circuit group and operates in the same way.

According to the arrangement like this, the output amplitude of the gate drive circuits can be adjusted stepwise from the near end to the far end based on the wiring length to the gate line to be driven, thereby reducing the resultant unevenness of brightness.

Figure 8:
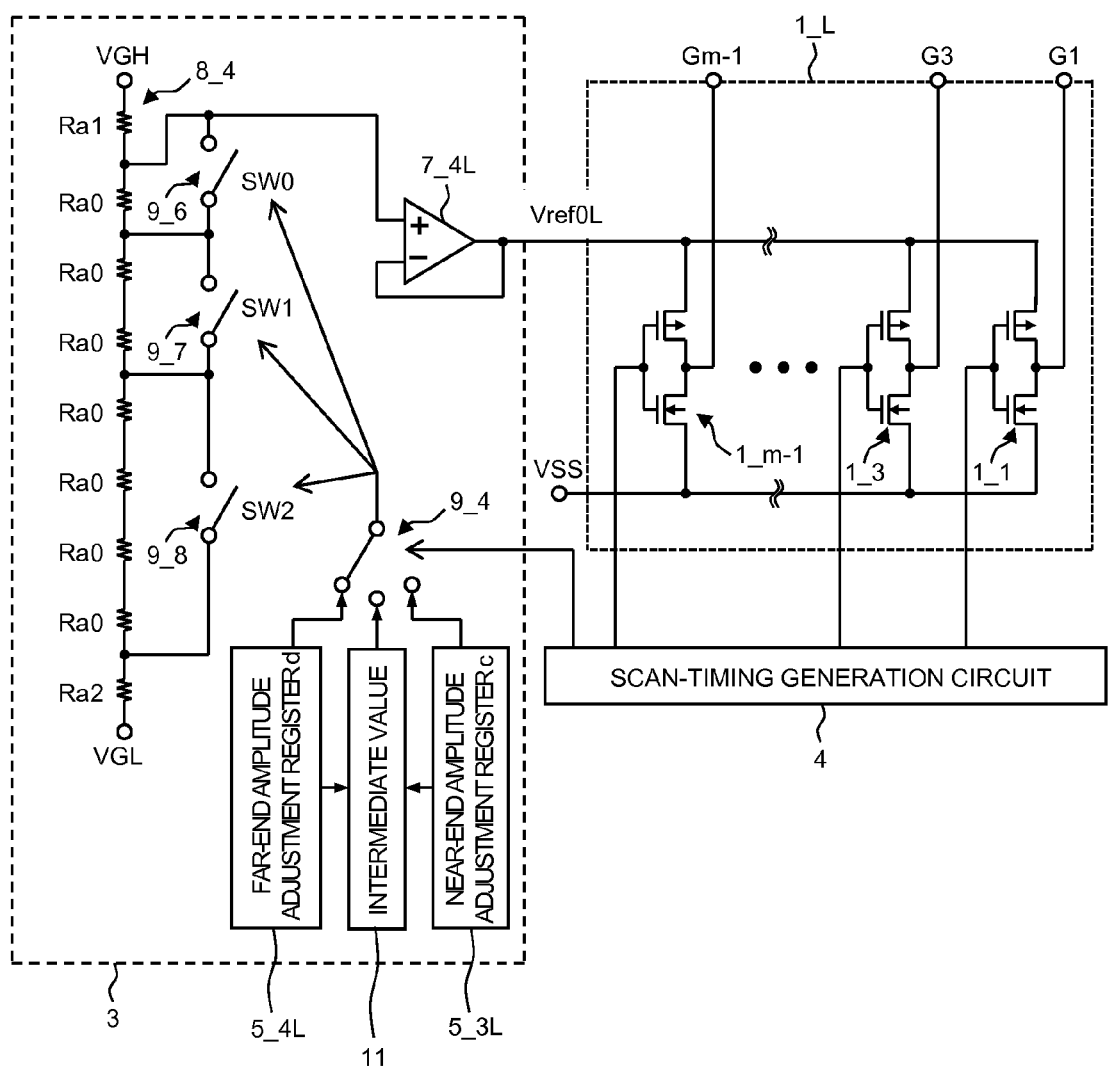
FIG. 8 is a circuit diagram showing the second example of the configuration of the output-amplitude-adjustment circuit.

FIG. 8 is a circuit diagram showing the second example of the configuration of the output-amplitude-adjustment circuit 3. The output-amplitude-adjustment circuit 3 supplies the first gate drive circuit group 1_L(1_1, 1_3, ..., 1_m-1) with the power source Vref0L. The gate drive circuits 1_1, 1_3, ..., 1_m-1 forming the first gate drive circuit group 1_L are composed of CMOS inverters respectively. The gate drive circuits 1_1, 1_3, ..., 1_m-1 are supplied with the power sources Vref0 and VSS, invert and amplify a scan-timing signal supplied from the scan-timing generation circuit 4, and drive a group of gate lines G1, G3, ..., Gm-1.

The output-amplitude-adjustment circuit 3 includes a resistance ladder 8_4, switches 9_6 to 9_8, a voltage follower circuit 7_4L, a switch 9_4, a near-end amplitude-adjustment register c(5_3L), a far-end amplitude-adjustment register d(5_4L), and a circuit 11 operable to calculate an intermediate value of parameters stored in the amplitude-adjustment registers. The resistance ladder 8_4 has a plurality of resistors connected in series between a high-potential-side power source VGH and a low-potential-side power source VGL, and outputs a gradation voltage from each tap. The resistance ladder 8_4 has the resistor Ra1 connected with the high-potential-side power source VGH, and the resistor Ra2 connected with the low-potential-side power source VGL, and the resistors Ra0 connected therebetween in series with one another. The resistance ladder outputs gradation voltages subjected to voltage division by the resistors. The switches 9_6 to 9_8 serve to select a gradation voltage from gradation voltages thus output, and supplies the selected voltage to the voltage follower circuit 7_4L. The voltage follower circuit 7_4L amplifies the current and supplies the power source Vref0L to the first gate drive circuit group 1_L. The gate drive circuits 1 forming the first gate drive circuit group 1_L are composed of CMOS inverters respectively. Therefore, their output amplitudes become Vref0L with respect to VSS.

The scan-timing generation circuit 4 controls the switch 9_4 to supply each of the switches 9_6 to 9_8 with an appropriate amplitude-adjustment value in synchronization with the supply of a scan-timing signal to each of the gate drive circuits 1_1 to 1_m-1 of the first gate drive circuit group 1_L as the scan-timing generation circuit shown in FIG. 7 does. Specifically, the near-end amplitude-adjustment register c(5_3L) is selected by the switch 9_4 in synchronization with the supply of a scan-timing signal to the gate drive circuit 1_m-1 operable to drive the gate line of the near end. The voltage Vref0L based on a parameter stored in the selected near-end amplitude-adjustment register c(5_3L) is selected by the switches 9_6 to 9_8, and supplied to the gate drive circuit 1_m-1 as a source voltage, which makes the output amplitude of a signal for driving the gate line Gm-1. In addition, the far-end amplitude-adjustment register d(5_4L) is selected by the switch 9_4 in synchronization with the supply of a scan-timing signal to the gate drive circuit 1_1 operable to drive the gate line of the far end. The voltage Vref0L based on a parameter stored in the selected far-end amplitude-adjustment register d(5_4L) is selected by the switches 9_6 to 9_8, and supplied to the gate drive circuit 1_1 as a source voltage, which makes the output amplitude of a signal for driving the gate line G1. The intermediate-value-calculation circuit 11 calculates an intermediate value of a parameter stored in the near-end amplitude-adjustment register c(5_3L) and a parameter stored in the far-end amplitude-adjustment register d(5_4L) between the near end and the far end, and supplies the value to the switches 9_6 to 9_8. While the description concerning the configuration of FIG. 8 is based on the assumption that the switch 9_4 is a three-contact switch in common with the description on the configuration of FIG. 7, the switch may be more finely controlled with four or more contacts by use of the intermediate-value-calculation circuit 11 having a multi-stage outputs. The relation between the output voltage Vref0L, and ON/OFF states of the switches 9_6 to 9_8 which depend on the near-end amplitude-adjustment register c(5_3L), the far-end amplitude-adjustment register d(5_4L), or an output from the intermediate-value-calculation circuit 11 is determined by the truth table shown in FIG. 5 and the formula 2.

In the case of adopting the output-amplitude-adjustment circuit 3 shown in FIG. 8, the first gate drive circuit group 1_L is divided into some sub-groups according to the wiring lengths to the first gate lines to be driven, and the output amplitude of a gate drive circuit 1 included in the sub-group concerned is adjusted to be a value based on its wiring length as in the case of the output-amplitude-adjustment circuit shown in FIG. 7. The gate drive circuits of each sub-group are adjusted in output amplitude by controlling the source voltage stepwise supplied to the first gate drive circuit group 1_L by the sub-group. When the gate lines are sequentially scanned from the far end toward the near end, the output amplitude is controlled to stepwise drop sequentially. While the illustration and description are skipped here, the output-amplitude-adjustment circuit 3 is also arranged to fit the second gate drive circuit group 1_R on the right as described concerning the first gate drive circuit group and operates in the same way. According to the arrangement like this, the output amplitude of the gate drive circuits can be stepwise adjusted from the near end to the far end based on the wiring length to the gate line to be driven, and thus the resultant unevenness of brightness can be reduced.

Figure 9:
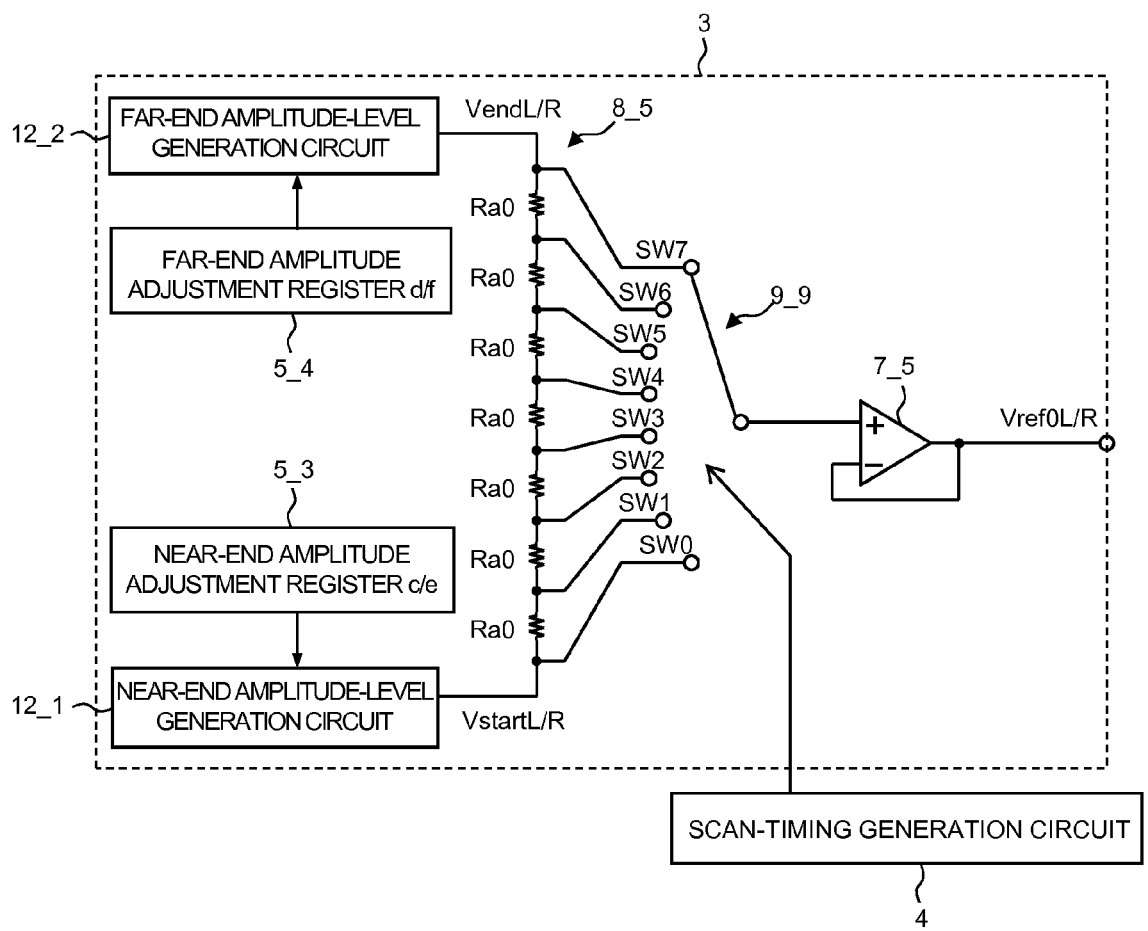
FIG. 9 is a circuit diagram showing the third example of the configuration of the output-amplitude-adjustment circuit.

FIG. 9 is a circuit diagram showing the third example of the configuration of the output-amplitude-adjustment circuit 3. The output-amplitude-adjustment circuit 3 includes a ladder resistance 8_5, a switch 9_9, a near-end amplitude-adjustment register c/e(5_3), a far-end amplitude-adjustment register d/f(5_4), a near-end amplitude-level generation circuit 12_1, and a far-end amplitude-level generation circuit 12_2. The ladder resistance 8_5 is a substitute for the ladder resistance 8_3 of FIG. 7, and has seven resistors Ra0 connected in series. The ladder resistance 8_5 is connected with the near-end amplitude-level generation circuit 12_1 at one end, and with the far-end amplitude-level generation circuit 12_2 at the other end. The near-end amplitude-level generation circuit 12_1 produces a near-end amplitude voltage VstartL/R based on the near-end amplitude-adjustment register c/e(5_3), and supplies it to one end of the ladder resistance 8_5. The far-end amplitude-level generation circuit 12_2 produces a far-end amplitude voltage VendL/R based on the far-end amplitude-adjustment register d/f(5_4), and supplies it to the other end of the ladder resistance 8_5. In the ladder resistance 8_5, a range of the near-end amplitude voltage VstartL/R to the far-end amplitude voltage VendL/R is divided into eight-gradation voltages, which are supplied to the switch 9_9. The scan-timing generation circuit 4 controls the switch 9_9 in synchronization with the supply of a scan-timing signal to gate drive circuits 1_1 to 1_m of a gate drive circuit group 1_L/R, and supplies a power source to each of the gate drive circuits 1_1 to 1_m of the gate drive circuit group 1_L/R. The relation between the select state of the switch 9_9 and the output voltage Vref0L/R is determined by the truth table shown in FIG. 3 and the formula 3 below.

$$Vref0 = \frac{Ra\Sigma}{7 \times Ra0} \times (Vend - Vstart) + Vstart \qquad \text{Formula 3}$$

Figure 12:
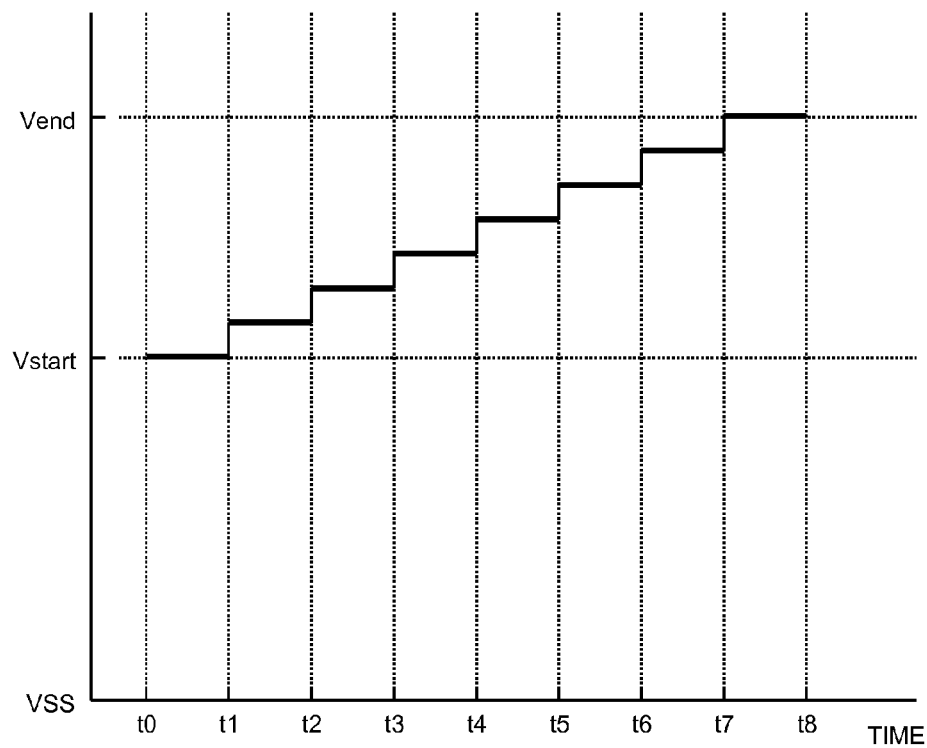
FIG. 12 is a waveform diagram showing the action of the output-amplitude-adjustment circuit of the third or fourth example of the configuration.

FIG. 12 is a waveform diagram showing the action of the output-amplitude-adjustment circuit 3 of the third example of the configuration. The horizontal axis represents time, and the vertical axis represents the output amplitude of the gate drive circuits relative to VSS. The gate lines are divided into eight sub-groups between the near end and the far end; the period of the time t0 to t1 is a period for driving the gate lines of the sub-group the closest to the near end, and the output amplitude of the gate drive circuit is Vstart. After that, the output amplitude of the gate drive circuit is raised stepwise in turn. The period of the time t7 to t8 is one for driving the gate lines of the sub-group the closest to the far end, during which the output amplitude of the gate drive circuit is Vend.

Figure 10:
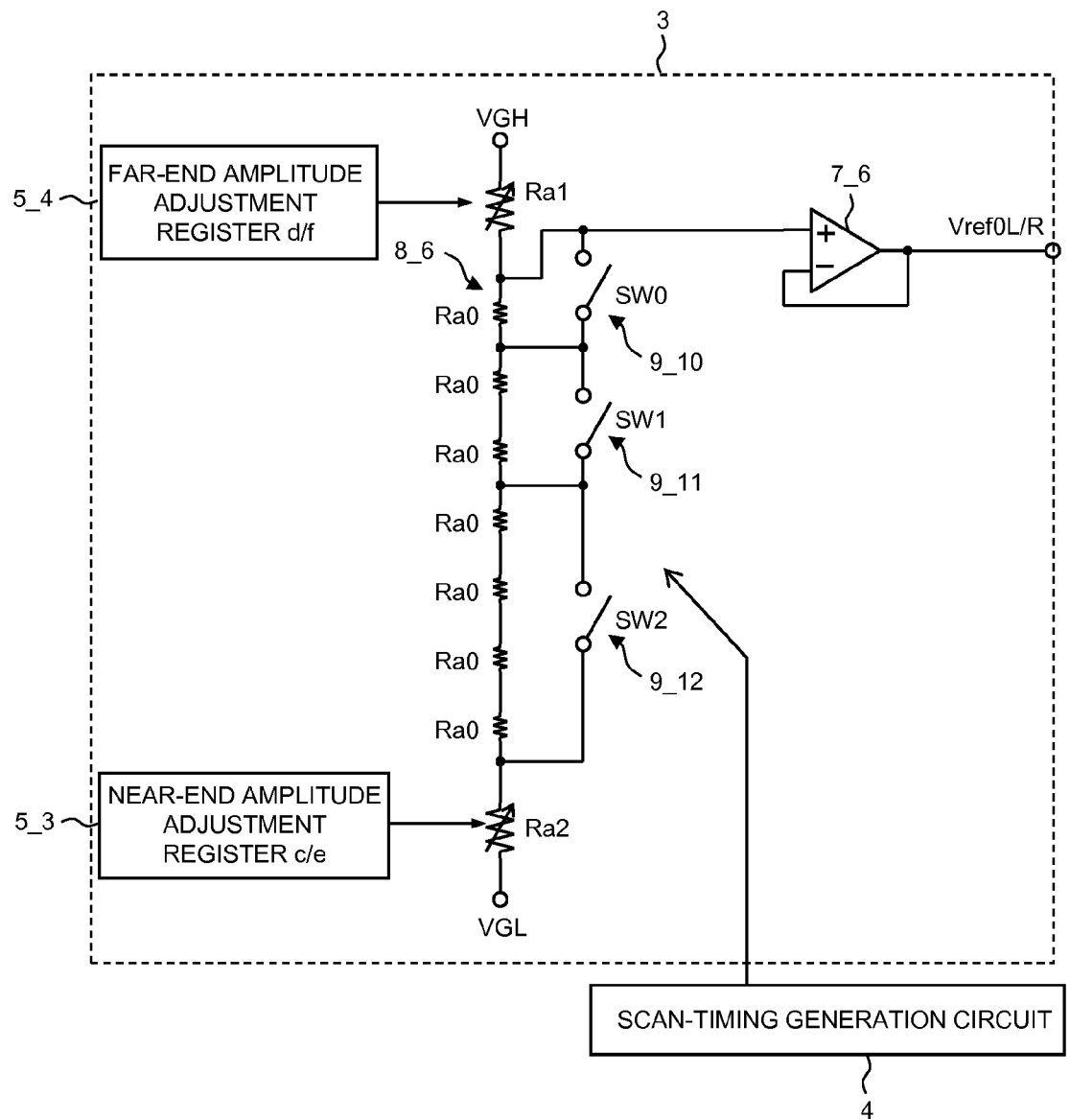
FIG. 10 is a circuit diagram showing the fourth example of the configuration of the output-amplitude-adjustment circuit.

FIG. 10 is a circuit diagram showing the fourth example of the configuration of the output-amplitude-adjustment circuit 3. The output-amplitude-adjustment circuit 3 includes a ladder resistance 8_6, switches 9_10 to 9_12, a near-end amplitude-adjustment register c/e(5_3), and a far-end amplitude-adjustment register d/f(5_4). The ladder resistance 8_6 has a resistor Ra1 connected with a high-potential-side power source VGH, and a resistor Ra2 connected with a low-potential-side power source VGL, and the resistors Ra0 connected therebetween in series with one another, and outputs gradation voltages subjected to voltage division by the resistors, as in the case of the ladder resistance 8_4 of FIG. 8. The value of the resistor Ra1 is adjusted by the far-end amplitude-adjustment register d/f (5_4), whereas the value of the resistor Ra2 is adjusted by the near-end amplitude-adjustment register c/e(5_3). The voltage depending on the combination of ON and OFF states of the switches 9_10 to 9_12 is supplied to the voltage follower circuit 7_6, and then supplied to the gate drive circuit 1 as a source voltage Vref0L/R by the voltage follower circuit 7_6. The relation between ON and OFF states of switches 9_10 to 9_12 and the output voltage Vref0L/R is determined by the truth table shown in FIG. 5 and the formula 2. Values of the resistors Ra1 and Ra2 at the ends are adjusted by the near-end amplitude-adjustment register c/e(5_3) and the far-end amplitude-adjustment register d/f(5_4), thereby setting the output amplitude of the gate drive circuit 1 when driving the gate line of the near end to be VstartL/R, and the output amplitude of the gate drive circuit 1 when driving the gate line of the far end to be VendL/R. The same synchronization control as conducted on the output-amplitude-adjustment circuit 3 shown in FIG. 9 is performed by the scan-timing generation circuit 4, whereby the output amplitude of the gate drive circuit can be controlled to be raised stepwise as shown in FIG. 12.

FIG. 11 is a circuit diagram showing the fifth example of the configuration of the output-amplitude-adjustment circuit 3. The output-amplitude-adjustment circuit 3 supplies the power source Vref0L to the first gate drive circuit group 1_L (1_1, 1_3, . . . , 1_m-1) in the same way as described with reference to FIG. 7 and other drawings. The gate drive circuits 1_1, 1_3, . . . , 1_m-1 forming the first gate drive circuit group 1_L are composed of CMOS inverters respectively. The gate drive circuits 1_1, 1_3, . . . , 1_m-1 are supplied with the power sources Vref0 and VSS, invert and amplify a scan timing signal supplied from the scan-timing generation circuit 4, and drive the group of gate lines G1, G3, . . . , Gm-1.

The output-amplitude-adjustment circuit 3 includes a PWM circuit 13, a charge pump 14, a low-pass filter 15, and a voltage follower circuit 7_7. The PWM circuit 13 is a pulse width modulation circuit which outputs pulses controlled in the pulse width within a range of duty ratios of 0 to 100%, for example (PWM: Pulse Width Modulation). The charge pump 14 is formed as is a CMOS inverter. To the charge pump, a voltage Vend corresponding to an output amplitude for the far-end gate line is coupled for a high-potential-side power source, and a voltage Vstart corresponding to an output amplitude for the near-end gate line is coupled for a low-potential-side power source. The charge pump 14 outputs the voltage Vend from its output terminal on input of a pulse having a duty ratio of 0% to its input terminal, and outputs the voltage Vstart from the output terminal on input of a pulse having a duty ratio of 100% to the input terminal. The output of the charge pump 14 is smoothed by the low-pass filter 15, and then supplied to the voltage follower 7_7. The relation between the PWM duty ratio and the output voltage Vref0 can be calculated by the formula 4 below.

$$Vref0 = PWM \times (Vend - Vstart) + Vstart \qquad \text{Formula 4}$$

The reason why the modulation is arranged to be performed in the range of duty ratios of 0 to 100% is that such modulation is just taken as an example for easier understanding. The actual percentage of modulation is made e.g. 5 to 95% in order to keep some margin and accordingly, the low-potential-side power source to supply to the charge pump 14 should be set to be lower than the voltage Vstart, and the high-potential-side power source should be set to be higher than the voltage Vend.

FIG. 13 is a waveform diagram showing the action of the output-amplitude-adjustment circuit 3 of the fifth example of the configuration. The horizontal axis represents time, and the vertical axis represents the output amplitude of the gate drive circuits relative to VSS as in FIG. 12. At the time to, the gate line of the near end is driven by the output amplitude Vstart. After that, the output amplitude is raised until the time t8 successively. At the time t8 when the gate line of the far end will be driven, the output amplitude is made the voltage Vend.

According to the arrangement like this, the output amplitude of the gate drive circuits can be adjusted successively from the near end to the far end based on the wiring length to the gate line to be driven, and thus the resultant unevenness of brightness can be reduced.

Fourth Embodiment

Display Drive Circuits on the Display Panel Side

Figure 14:
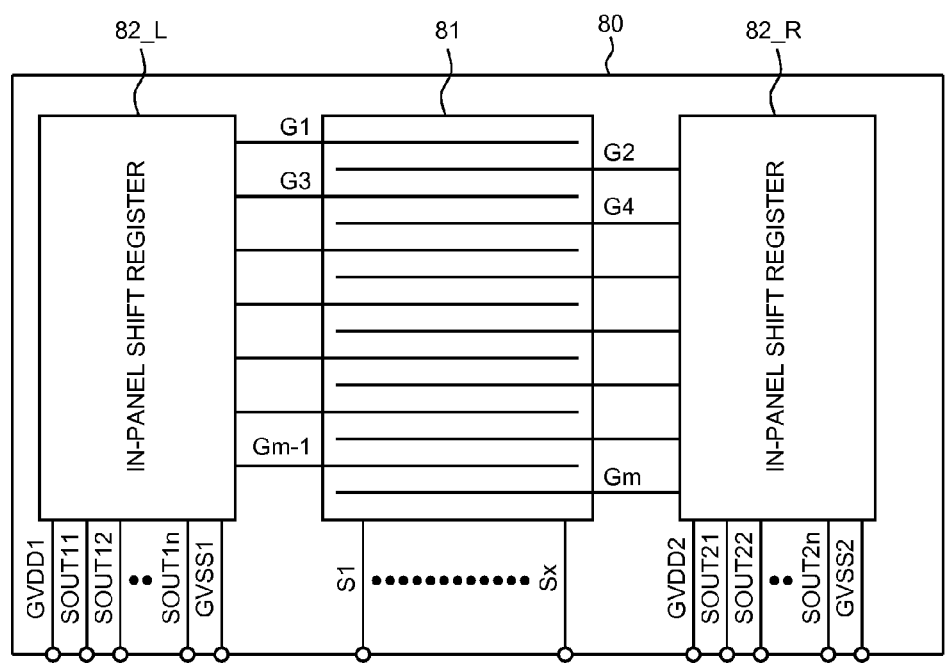
FIG. 14 is a block diagram showing the configuration of a display panel according to the fourth embodiment.

FIG. 14 is a block diagram showing the configuration of the display panel 80 according to the fourth embodiment. The display panel 80 has in-panel shift registers 82_L and 82_R on the left and the right of an active matrix 81. The active matrix 81 has a plurality of source lines S1 to Sx and a plurality of gate lines G1 to Gm which intersect with one another, and pixels arranged at intersections of the source and gate lines respectively; the source lines S1 to Sx are wired to run in an up-and-down direction, and the gate lines G1 to Gm are wired to run in left and right directions when viewed from a direction perpendicular to a substrate. The in-panel shift register 82_L disposed on the left includes: a group of first gate drive circuits 1_1, 1_3, . . . , 1_m-1 for driving a group of gate lines G1, G3, . . . , Gm-1; and a shift register for sequentially supplying a scan-timing signal to the group of first gate drive circuits 1_1, 1_3, . . . , 1_m-1. The in-panel shift register 82_L is supplied with power sources GVDD1 and GVSS1, and control signals SOUT11 to SOUT1n including clock and start signals for controlling the shift register. The in-panel shift register 82_R disposed on the right includes: a group of second gate drive circuits 1_2, 1_4, . . . , 1_m for driving a group of gate lines G2, G4, . . . , Gm; and a shift register for sequentially supplying a scan-timing signal to the group of second gate drive circuits 1_2, 1_4, . . . , 1_m. The in-panel shift register 82_R is supplied with power sources GVDD2 and GVSS2, and control signals SOUT21 to SOUT2n including clock and start signals for controlling the shift register. The shift registers and the gate drive circuits 1 are not particularly restricted, but they can be formed on a substrate of the display panel 80, such as a glass one, by use of TFTs (TFT: Thin-Film Transistor) based on LTP(Low-Temperature Poly Silicon) or the like, for example.

Figure 15:
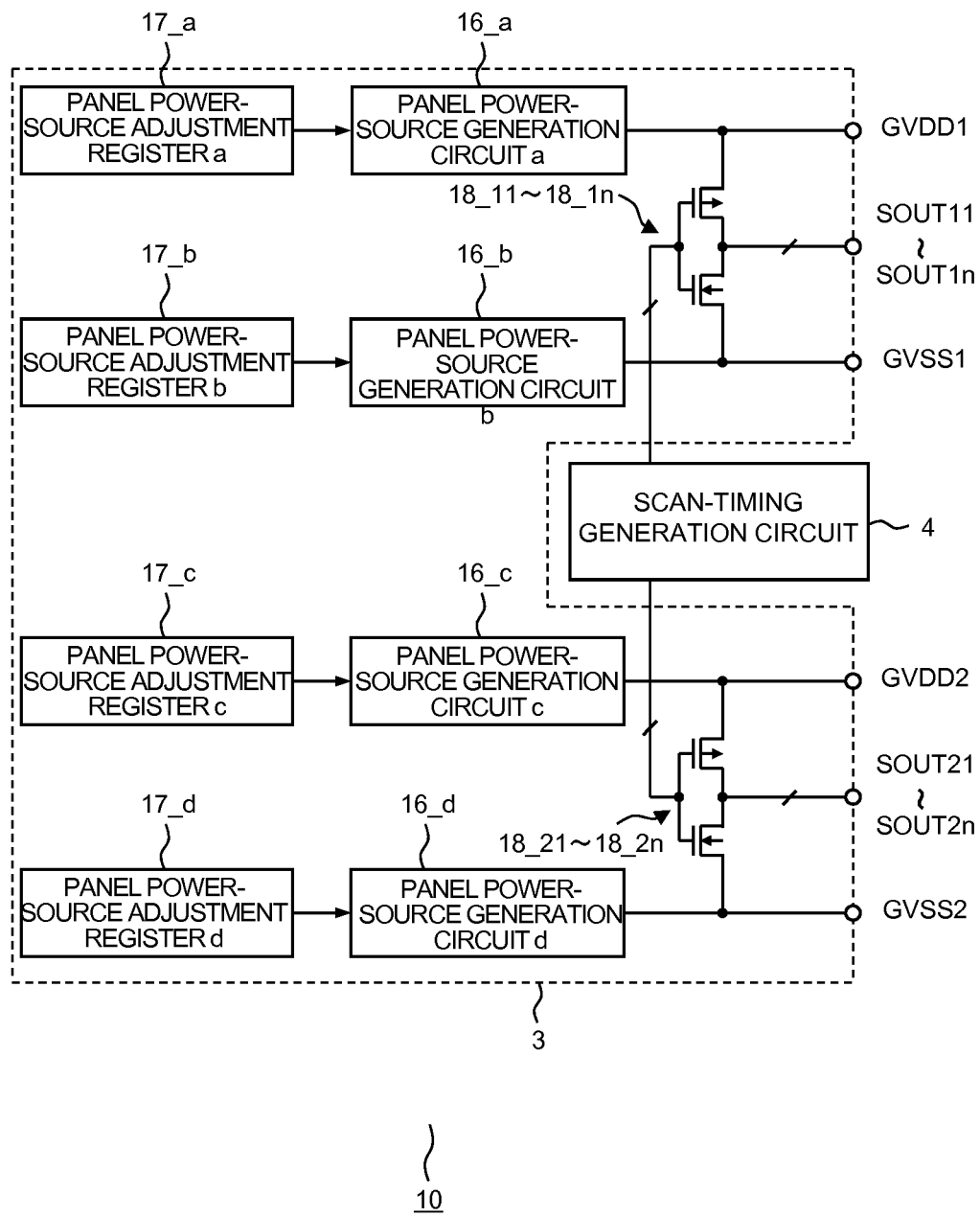
FIG. 15 is a block diagram showing the configuration of a display driver according to the fourth embodiment.

FIG. 15 is a block diagram showing the configuration of the display driver 10 according to the fourth embodiment. The display driver 10 includes an output-amplitude-adjustment circuit 3, a scan-timing generation circuit 4, and a source drive circuit 2 (not shown). The output-amplitude-adjustment circuit 3 includes panel-power-source-generation circuits a to d(16_a to 16_d), panel-power-source adjustment registers a to d(17_a to 17_d), and inverters 18_11 to 18_1n and 18_21 to 18_2n. The panel-power-source-generation circuit a(16_a) generates GVDD1 based on a parameter specified by the panel-power-source adjustment register a(17_a), and the panel-power-source-generation circuit b(16_b) generates GVSS1 based on a parameter specified by the panel-power-source adjustment register b(17_b); the voltages GVDD1 and GVSS1 are supplied to the in-panel shift register 82_L on the left. The inverters 18_11 to 18_1n are supplied with the voltages GVDD1 and GVSS1 as power sources, convert control signals supplied from the scan-timing generation circuit 4 in level, and supply control signals SOUT11 to SOUT1n to the in-panel shift register 82_L on the left. The panel-power-source-generation circuit c(16_c) generates GVDD2 based on a parameter specified by the panel-power-source adjustment register c(17_c), and the panel-power-source-generation circuit d(16_d) generates GVSS2 based on a parameter specified by the panel-power-source adjustment register d(17_d); the voltages GVDD2 and GVSS2 are supplied to the in-panel shift register 82_R on the right. The inverters 18_21 to 18_2n are supplied with the voltages GVDD2 and GVSS2 as power sources, convert control signals supplied from the scan-timing generation circuit 4 in level, and supply control signals SOUT21 to SOUT2n to the in-panel shift register 82_R on the right.

According to the arrangement like this, the output amplitude for driving the group of gate lines G1, G3, . . . , Gm-1 to be driven from the left, and the output amplitude for driving the group of gate lines G2, G4, . . . , Gm to be driven from the right are set independently by the panel-power-source adjustment registers a and b(17_a and 17_b), and the panel-power-source adjustment registers c and d(17_c and 17_d) respectively. Therefore, even in the display driver 10 connected with the display panel 80 having gate drive circuits 1 therein, the unevenness of brightness resulting from the difference between right and left wired paths, and the differences in the line resistance and the line capacitance can be reduced.

Figure 16:
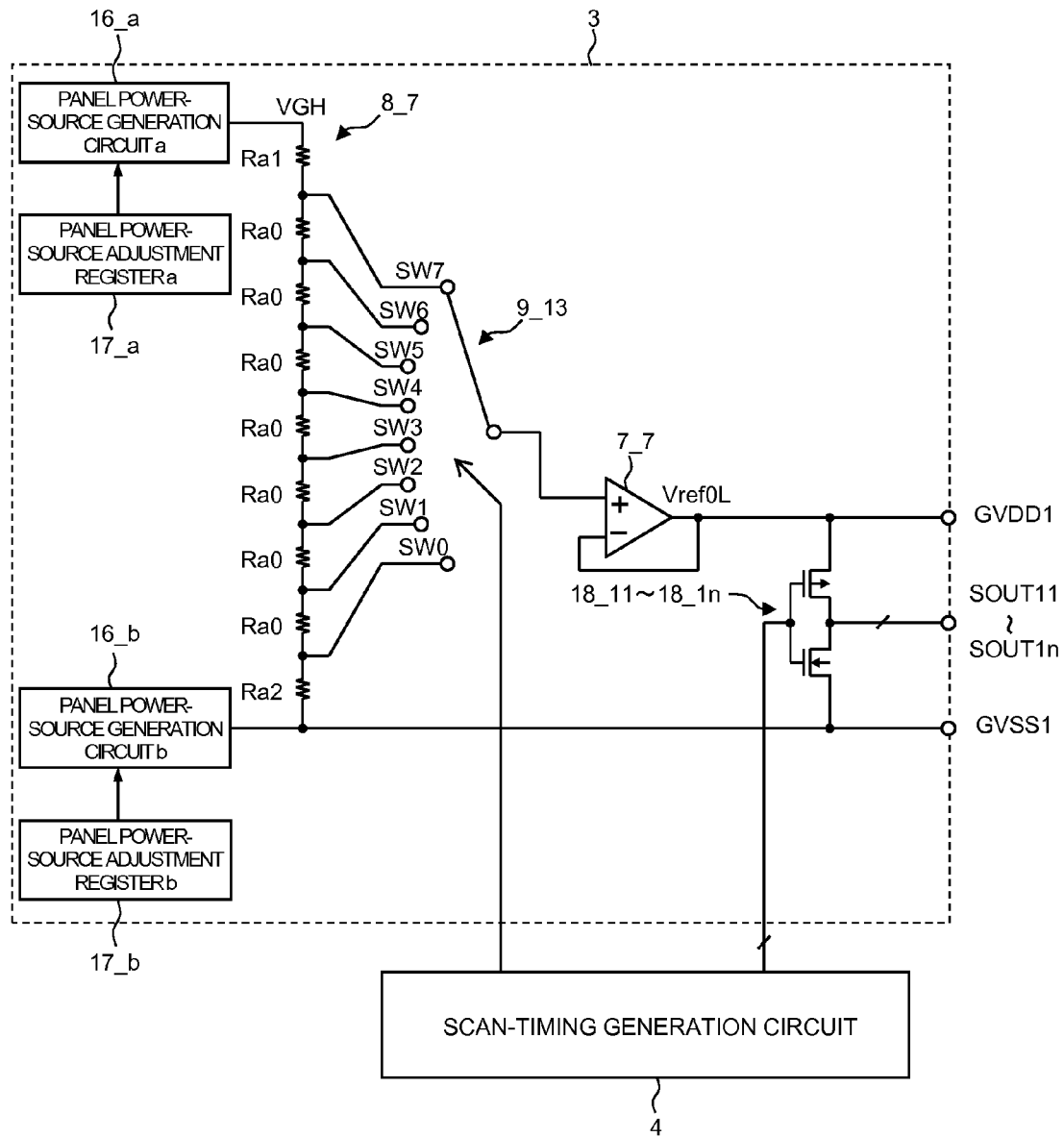
FIG. 16 is a circuit diagram showing the first example of the configuration of an output-amplitude-adjustment circuit according to the fourth embodiment.

FIG. 16 is a circuit diagram showing the first example of the configuration of the output-amplitude-adjustment circuit 3 according to the fourth embodiment.

While the output-amplitude-adjustment circuit 3 includes circuits connected with the in-panel shift registers 82_L and 82_R on the left and the right, only a circuit connected with the in-panel shift register 82_L is drawn in FIG. 16. The output-amplitude-adjustment circuit 3 includes panel-power-source adjustment registers a and b(17_a and 17_b), panel-power-source-generation circuits a and b(16_a and 16_b), a resistance ladder 8_7, a switch 9_13, a voltage follower circuit 7_7, and inverters 18_11 to 18_1n. The panel-power-source-generation circuit b(16_b) generates GVSS1 based on a parameter specified by the panel-power-source adjustment register b(17_b), uses it as a low-potential-side power source of the resistance ladder 8_7, the voltage follower circuit 7_7, and the inverters 18_11 to 18_1n, and supplies the voltage GVSS1 to the in-panel shift register 82_L. The panel-power-source-generation circuit a(16_a) generates a voltage VGH higher than GVDD1 based on a parameter specified by the panel-power-source adjustment register a(17_a), and supplies it to the resistance ladder 8_7. The resistance ladder 8_7 provides, as the power source GVDD1, a potential selected from gradation potentials resulting from the voltage division by the switch 9_13. Then, the voltage follower circuit 7_7 performs a current amplification thereon, and supplies the resultant GVDD1 for the high-potential-side power source of the inverters 18_11 to 18_1n and supplies it to the in-panel shift register 82_L. The inverters 18_11 to 18_1n convert, in level, control signals supplied from the scan-timing generation circuit 4 to output control signals SOUT11 to SOUT1n. The switch 9_13 is a switch for selecting one of eight input contacts labeled with SW0 to SW7 to output. Depending on what contact of SW0 to SW7 is selected, the resistance-select value Ra$\Sigma$ changes as shown in FIG. 3, and the gradation voltage GVDD1 to be output is selected. The voltage of the gradation voltage GVDD1 to be output is calculated according to a formula similar to the formula 1. In this example shown here, the selection out of gradation voltages of eight gradations is performed, but the number of gradations may be changed appropriately.

The switch 9_13 may be arranged so as to be controlled by the scan-timing generation circuit 4 in synchronization with control signals SOUT11 to SOUT1n as shown in the drawing. As shown in connection with the output-amplitude-adjustment circuit 3 according to the third embodiment, GVDD1 output by the display driver 10 is made the highest in line with the timing when the gate drive circuit in the in-panel shift register 82_L drives the gate line of the far end, and GVDD1 output by the display driver 10 is made the lowest in line with the timing when the gate drive circuit drives the gate line of the near end. For instance, the power source GVDD1 output by the display driver 10 is controlled stepwise as shown in FIG. 12. The lengths of wiring from the gate drive circuits to the respective gate lines can be made shorter and fixed by forming the gate drive circuits in the panel, but of the wiring lengths of the power sources (GVDD1 and GVSS1) from the display driver 10 to the gate drive circuits in the in-panel shift register 82_L, the longest one is the length to the gate drive circuit of the far end, and the shortest one is the length to the gate drive circuit of the near end. The difference in wiring lengths of the power sources will change an amount of voltage drop and consequently, change the output amplitude of a gate-drive signal output by the gate drive circuit as well. The output amplitude of the gate drive circuit for driving the gate line of the far end would be the smallest. Hence, compensating a voltage drop in the power-source line by making the highest the power source GVDD1 output by the display driver 10 when the gate line of the far end is driven, the output amplitudes when the far-end and near-end gate lines are driven can be controlled so as to be equal to each other in amplitude value.

The output amplitude of the gate drive circuit can be adjusted based on the wiring length of the power-source line (GVDD1, GVSS1, GVDD2, GVSS2) to a gate line to be driven, and the output amplitude to the gate line of the far end can be made larger than the output amplitude to the gate line of the near end. According to the arrangement like this, the attenuation of the output amplitude of the gate drive circuit resulting from a voltage drop caused by the line resistance and the line capacitance of the power-source line is compensated and therefore, the resultant unevenness of brightness can be reduced further.

Figure 17:
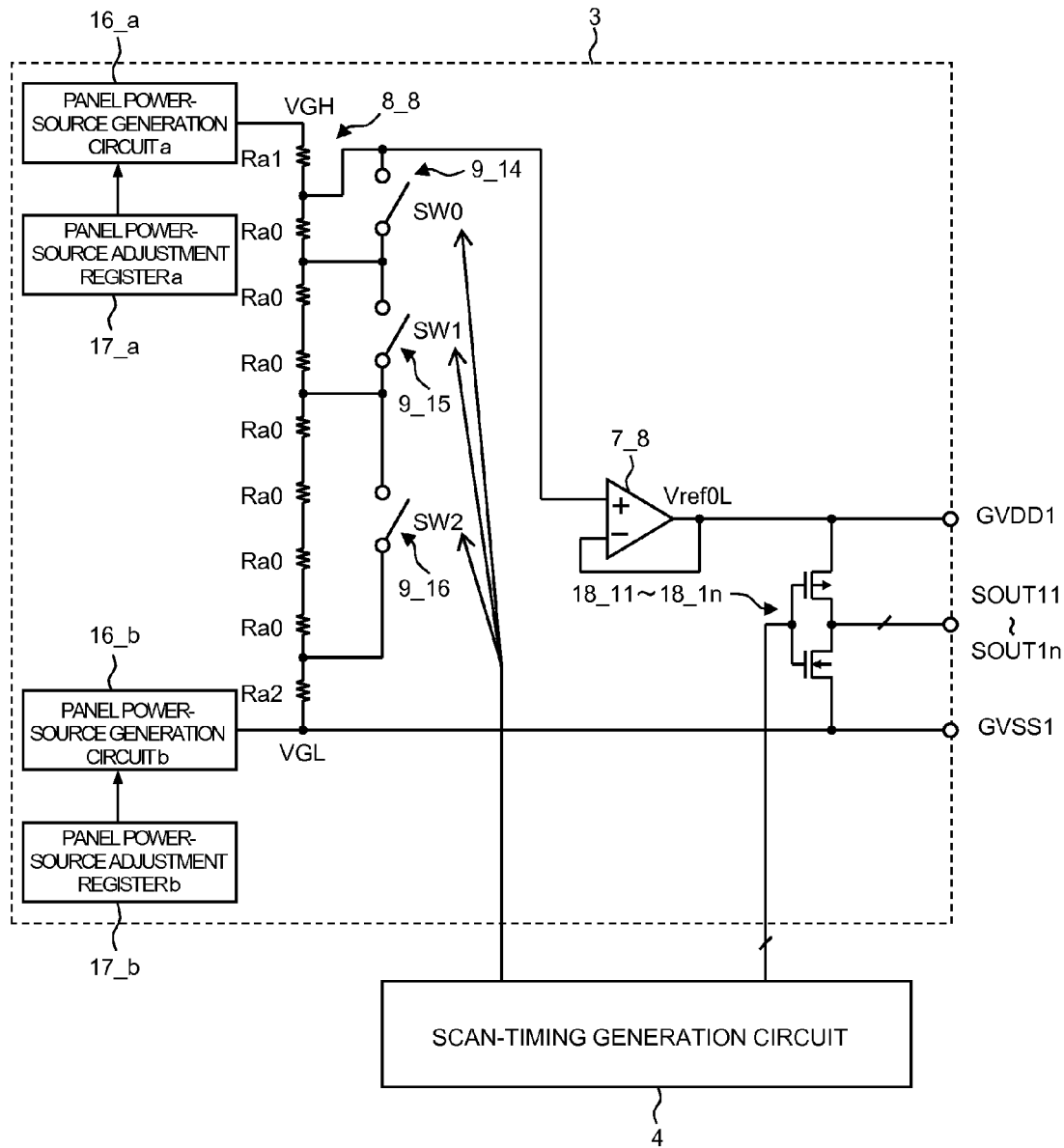
FIG. 17 is a circuit diagram showing the second example of the configuration of the output-amplitude-adjustment circuit.

FIG. 17 is a circuit diagram showing the second example of the configuration of the output-amplitude-adjustment circuit 3. Also, in FIG. 17, only the circuit connected with the in-panel shift register 82_L is drawn. The output-amplitude-adjustment circuit 3 includes panel-power-source adjustment registers a and b(17_a and 17_b), panel-power-source-generation circuits a and b(16_a and 16_b), a resistance ladder 8_8, switches 9_14, 9_15 and 9_16, a voltage follower circuit 7_8, and inverters 18_11 to 18_1n. The panel-power-source-generation circuit b(16_b) generates GVSS1 based on a parameter specified by the panel-power-source adjustment register b(17_b), uses it as a low-potential-side power source of the resistance ladder 8_8, the voltage follower circuit 7_8, and the inverters 18_11 to 18_1n, and supplies the voltage GVSS1 to the in-panel shift register 82_L. The panel-power-source-generation circuit a(16_a) generates a voltage VGH higher than GVDD1 based on a parameter specified by the panel-power-source adjustment register a(17_a), and supplies it to the resistance ladder 8_8. The resistance ladder 8_8 provides, as a power source GVDD1, a potential selected, by the switches 9_14, 9_15 and 9_16, from gradation potentials subjected to voltage division by resistances. Then, the voltage follower circuit 7_8 performs a current amplification thereon, and supplies the resultant GVDD1 for the high-potential-side power source for the inverters 18_11 to 18_1n, and supplies it to the in-panel shift register 82_L. The inverters 18_11 to 18_1n convert, in level, control signals supplied from the scan-timing generation circuit 4 to supply control signals SOUT11 to SOUT1n. Depending on the combination of ON and OFF states of the three switches 9_14, 9_15 and 9_16, the resistance-select value Ra$\Sigma$ changes in the same way as described with reference to FIG. 5, and the gradation voltage Vref0L to be output is selected. The voltage of the gradation voltage Vref0L to be output is calculated according to a formula similar to the formula 2. In this example shown here, the selection out of gradation voltages of eight gradations is performed, but the number of gradations may be changed appropriately.

The switches 9_14, 9_15 and 9_16 may be arranged so as to be controlled by the scan-timing generation circuit 4 in synchronization with control signals SOUT11 to SOUT1n as shown in the drawing. As in the example shown in FIG. 16, GVDD1 output by the display driver 10 is made the highest in line with the timing when the gate drive circuit in the in-panel shift register 82_L drives the gate line of the far end, and GVDD1 output by the display driver 10 is made the lowest in line with the timing when the gate drive circuit drives the gate line of the near end. For instance, the power source GVDD1 output by the display driver 10 is controlled stepwise as shown in FIG. 12. According to the arrangement like this, the attenuation of the output amplitude of the gate drive circuit resulting from a voltage drop caused by the line resistance and the line capacitance of the power-source line (GVDD1, GVSS1, GVDD2, GVSS2) is compensated and therefore, the resultant unevenness of brightness can be reduced further.

Figure 18:
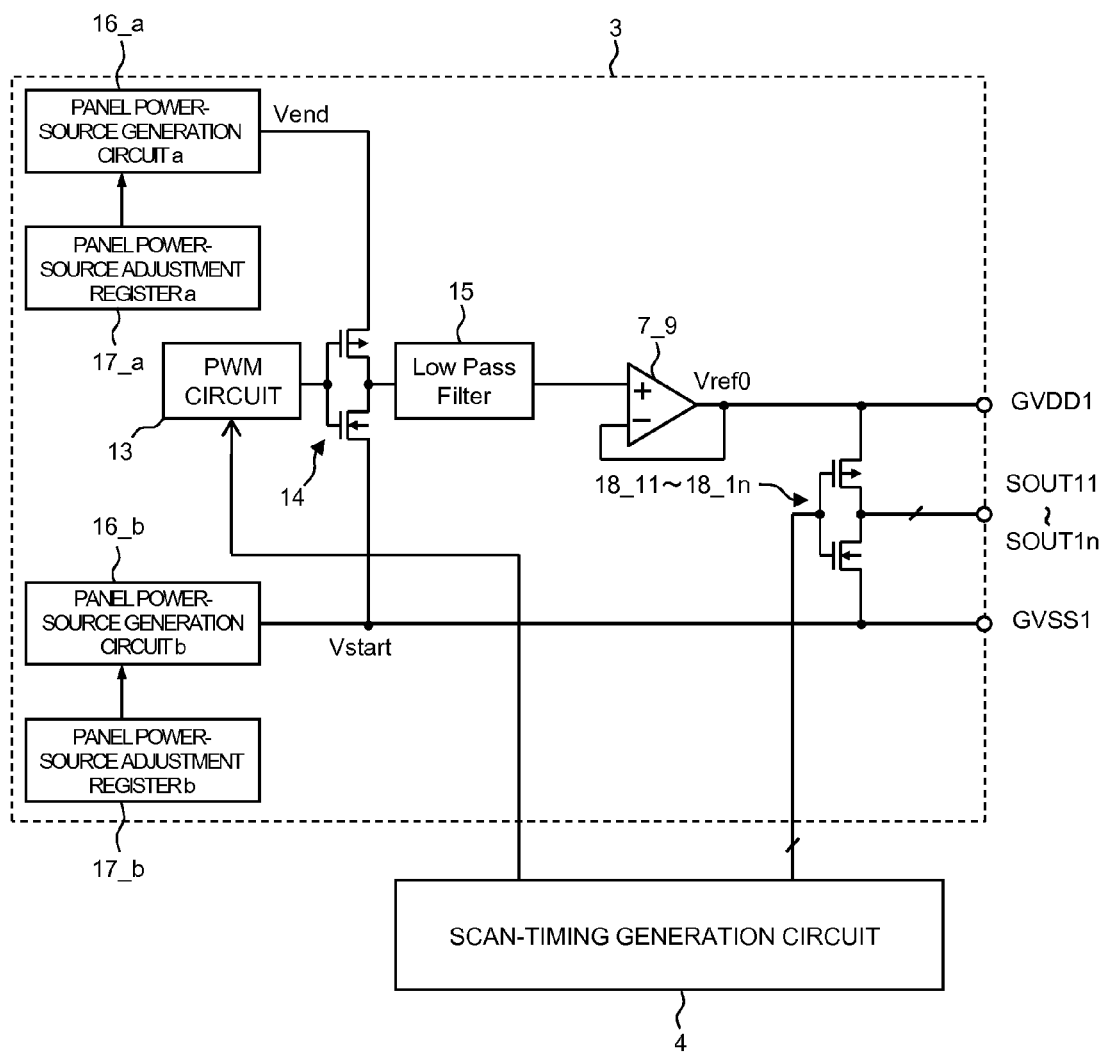
FIG. 18 is a circuit diagram showing the third example of the configuration of the output-amplitude-adjustment circuit.

FIG. 18 is a circuit diagram showing the third example of the configuration of the output-amplitude-adjustment circuit 3. Also in FIG. 18, only a circuit connected with the in-panel shift register 82_L is drawn. The output-amplitude-adjustment circuit 3 includes panel-power-source adjustment registers a and b(17_a and 17_b), panel-power-source-generation circuits a and b(16_a and 16_b), a PWM circuit 13, a charge pump 14, a low-pass filter 15, a voltage follower circuit 7_9, and inverters 18_11 to 18_1n. The panel-power-source-generation circuit b(16_b) generate GVSS1 based on a parameter specified by the panel-power-source adjustment register b(17_b), uses it as a common low-potential-side power source in the output-amplitude-adjustment circuit 3 including the inverters 18_11 to 18_1n and in addition, supplies it to the in-panel shift register 82_L. The panel-power-source-generation circuit a(16_a) generates a voltage Vend higher than GVDD1 based on a parameter specified by the panel-power-source adjustment register a(17_a), and supplies it to the charge pump 14. The PWM circuit 13 controls the duty ratio of a pulse input to the charge pump 14 in synchronization with a scan-timing signal supplied from the scan-timing generation circuit 4. For instance, the duty ratio is controlled between 90 and 100% on condition that GVDD1 when driving the gate line of the far end is equal to Vend, and GVDD1 when driving the gate line of the near end is lowered by 10% from it, or the amplitude for the gate line of the far end is 10% lower than that for the gate line of the near end. According to the arrangement like this, the output amplitude of each gate drive circuit to the gate lines of the near end to the far end can be successively adjusted based on the wiring length of a power-source line (GVDD1, GVSS1, GVDD2, GVSS2) to a gate line to be driven and thus, the resultant unevenness of brightness can be reduced.

The output-amplitude-adjustment circuit 3 may be arranged so that the voltage Vstart is isolated from GVSS1, and used as GVDD1 when driving the gate line of the near end, and the duty ratio is controlled between 0 and 100% inclusive as in the output-amplitude-adjustment circuit 3 of FIG. 11. In this case, GVDD1 is adjusted from the value for the near end to that for the far end successively as shown in FIG. 13 in the same way as in the third embodiment.

Fifth Embodiment

Automatic Self-Compensation

Figure 19:
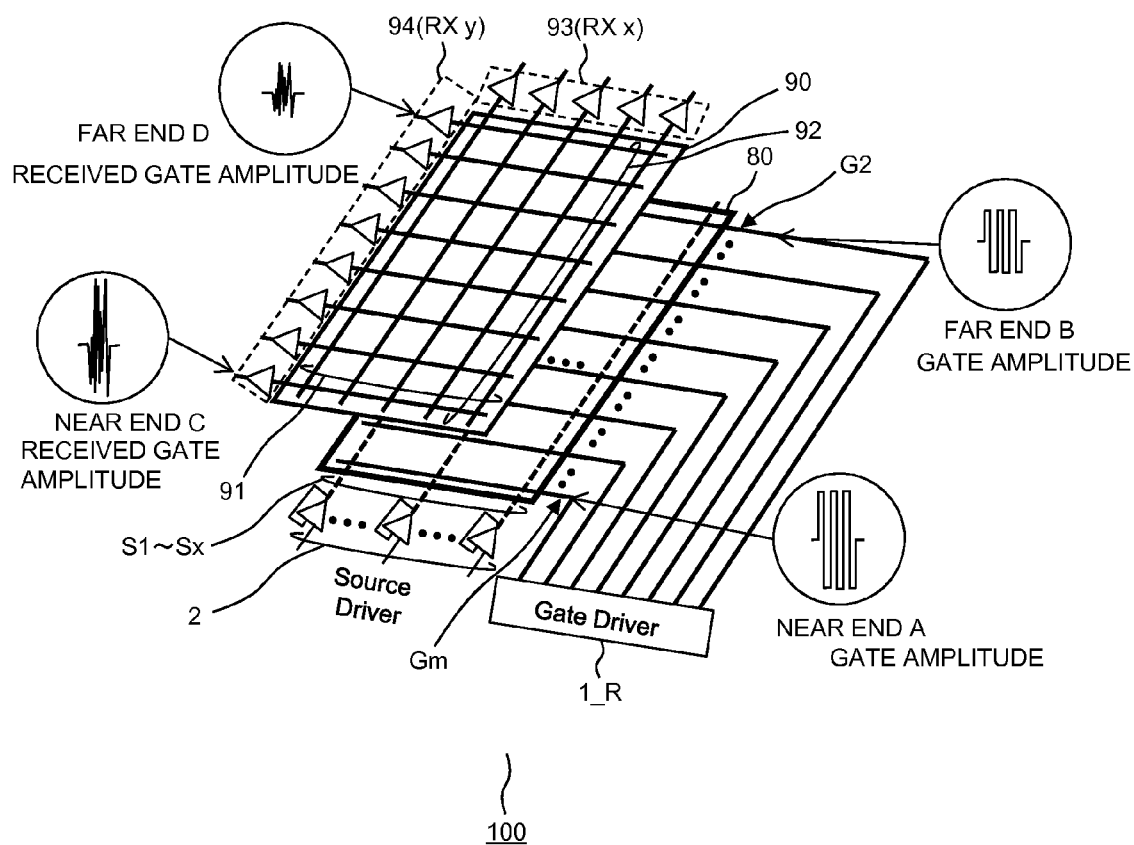
FIG. 19 is an explanatory diagram showing the configuration of a display device according to the fifth embodiment.

FIG. 19 is an explanatory diagram showing the configuration of the display device 100 according to the fifth embodiment. The display device 100 includes a display panel 80 and a touch panel 90. The display panel 80 is an active matrix type display panel which has a plurality of source lines S1 to Sx and a plurality of gate lines G1 to Gm which intersect with one another, and pixels arranged at intersections of the source and gate lines respectively, and in which the source lines S1 to Sx are wired to run in an up-and-down direction, and the gate lines G1 to Gm are wired to run in left and right directions when viewed from a direction perpendicular to a substrate. The touch panel 90 is a self-capacitance type touch sensor panel which includes a plurality of touch detection lines 91 wired to run in an up-and-down direction and a plurality of touch detection lines 92 wired to run in left and right directions, and which is laminated on the display panel 80 in e.g. an in-cell or on-cell form. The source lines S1 to Sx of the display panel 80 are connected with source drive circuits 2, and gate drive circuits 1_L and 1_R are connected to the gate lines G1 to Gm on the left and the right. In FIG. 19, the gate drive circuit 1_L on the left is not shown. The touch detection lines 91 of the touch panel 90 are each connected with a receive circuit (RXx) 93; the touch detection lines 92 are each connected with a receive circuit (RXy) 94. The number of touches and the position thereof are detected by sensing a capacitance change caused by a touch operation.

For instance, the source drive circuits 2, the gate drive circuits 1_L and 1_R, and the receive circuits (RXx and RXy) 93 and 94 are arranged in a display driver 10 formed on a single semiconductor substrate, and the display driver 10 is flip-chip mounted on a substrate of the display panel 80. Part of the circuits may be formed in another semiconductor chip, or may be formed by TFTs on a substrate of the display panel 80 or touch panel 90.

The display device 100 is capable of performing a self-auto compensation (self-auto calibration) in which the amplitude on the gate line driven by each gate drive circuit 1 is estimated from the amplitude of a signal arising on one or each of the touch detection lines 91 and 92, adjustment is made so that the amplitude on the far-end gate line is the same as that on the near-end gate line in amplitude. One example of a method therefor will be described below.

The gate drive circuit 1_R drives the gate line Gm of the near end A with a gate amplitude Vstart, and the amplitude receive level arising on the touch detection line of the near end C of the touch detection lines 92 extending in parallel with the gate line Gm is detected by the receive circuit RXy 94. Next, the gate drive circuit 1_R drives the gate line G2 of the far end B with a gate amplitude Vend, and the amplitude receive level arising on the touch detection line of the far end D of the touch detection lines 92 extending in parallel with the gate line G2 is detected by the receive circuit RXy 94. Each or one of the gate amplitude Vstart and Vend is adjusted so that the gate amplitude receive level of the near end C and the gate amplitude receive level of the far end D are equal to each other. For instance, each time the amplitude-transmit level at the far end B is changed with the amplitude at the near end A fixed, the value of the gate amplitude receive level at the far end D is compared with the value of the gate amplitude receive level at the near end C; the process is repeated until the values are equal to each other. A gate amplitude set value Vend of the far end B when the values are equal to each other is used for a display-correcting action as a gate-amplitude-correction value. The gate drive circuit 1_L on the left is adjusted so as to achieve the same amplitude receive level as that on the right and then, the same adjustment for the far and near ends as described above is performed. Now, it is noted that "equal" or "same" amplitude, voltage, and level do not means they must be exactly the same as what they are contrasted with, and making/being "equal" or the "same" implies that a variable or physical quantity represented by a word modified by the adjective "equal" or "same" is adjusted so as to be equal/nearly equal to or the same/nearly the same as what the variable or physical quantity is contrasted with, or adjusted so as to make smaller the difference therebetween. The reason for this is it suffices that the difference becomes small to the extent that the unevenness of brightness cannot be seen with the human eye.

According to the arrangement like this, with a display driver 10 operable to activate a display panel 80 with a touch panel 90 laminated thereon, the unevenness of brightness owing to the difference between right and left wired paths of gate lines and/or the difference between wiring layers can be reduced while accommodating each individual characteristics. Also, it is possible to build a self-auto compensation (self-auto calibration) circuit having the function as described above in the display driver 10. On the other hand, the display driver may be arranged so that such compensation means is externally added only at the time of calibration, and a compensation value is held in a non-volatile memory therein. By saving a compensation value in a non-volatile memory, and arranging the display driver so that the compensation value is loaded into a register at power-on or reset, the start of a corrected display action can be speeded up.

In addition, control may be conducted so that the driving by the source drive circuit 2 remains stopped and the source lines S1 to Sx are made high impedance during a period of self-auto compensation. According to the arrangement like this, the sensitivity of detection of signal amplitudes on the gate lines by the touch detection lines can be increased further.

While the invention made by the inventor has been concretely described above based on the embodiments, the invention is not so limited. It is obvious that various changes and modifications may be made without departing from the subject matter thereof.

For instance, as to the gate drive circuit 1, the source drive circuit 2, the output-amplitude-adjustment circuit 3, and the scan-timing generation circuit 4, having their functions is all that is needed. So, these circuits may be integrally formed in a functional block or functional module of another name together with other circuits. In addition, a semiconductor integrated circuit of one chip having all of them built therein may be formed, otherwise part of them may be formed in another chip or formed by TFTs on a substrate of the display panel 80 or the like.

What is claimed is:

1. A display driver connectable with a display panel having a plurality of source lines wired to run in an up-and-down direction and a plurality of gate lines wired to run in left and right directions when viewed from a direction perpendicular to a substrate, and a plurality of pixels respectively arranged at intersections where the source and gate lines intersect with one another, in which electric charges corresponding to display data are transmitted from the source lines to the pixels selected by the driven gate line, the display driver comprising:

an output-amplitude-adjustment circuit capable of adjusting, in output amplitude, a group of first gate drive circuits operable to drive, of the plurality of gate lines, a group of first gate lines wired from the left, and a group of second gate drive circuits operable to drive a group of second gate lines wired from the right, wherein the output-amplitude-adjustment circuit adjusts said first and second gate line groups independently of one another, and wherein the output-amplitude-adjustment circuit comprises a first register which determines a first maximum amplitude among amplitudes driven by the first gate drive circuits, and a second register which determines a second maximum amplitude among amplitudes driven by the second gate drive circuits, so as to decrease differences between first maximum amplitudes on the first gate lines which are controlled by setting a first value in the first register, and second maximum amplitudes on the second gate lines which are controlled by setting a second value in the second register.

2. The display driver according to claim 1, wherein the output-amplitude-adjustment circuit makes the output amplitude of the first gate drive circuit longer in wiring length to the first gate line to be driven in the group of first gate drive circuits larger than that of the first gate drive circuit shorter in wiring length to the first gate line to be driven, and the output-amplitude-adjustment circuit makes the output amplitude of the second gate drive circuit longer in wiring length to the second gate line to be driven in the group of second gate drive circuits larger than that of the second gate drive circuit shorter in wiring length to the second gate line to be driven.

3. The display driver according to claim 2, wherein the output-amplitude-adjustment circuit is capable of adjusting, based on the wiring length to the first gate line to be driven, the output amplitude of first gate drive circuits included in each of sub-groups which the group of first gate drive circuits are divided into to have a value based on the wiring length, and the output-amplitude-adjustment circuit is capable of adjusting, based on the wiring length to the second gate line to be driven, the output amplitude of second gate drive circuits included in each of sub-groups which the group of second gate drive circuits are divided into to have a value based on the wiring length.

4. The display driver according to claim 2, wherein the output-amplitude-adjustment circuit is capable of successively adjusting the output amplitude of a first gate drive circuit included in the group of first gate drive circuits based on the wiring length to the first gate line to be driven, and the output-amplitude-adjustment circuit is capable of successively adjusting the output amplitude of a second gate drive circuit included in the group of second gate drive circuits based on the wiring length to the second gate line to be driven.

5. The display driver according to claim 1, wherein the group of first gate drive circuits and the group of second gate drive circuits are mounted on the display panel, the display driver supplies the group of first gate drive circuits with a first power source, and the group of second gate drive circuits with a second power source, and the output-amplitude-adjustment circuit is capable of adjusting, in voltage, the first power source and the second power source independently of each other.

6. The display driver according to claim 5, wherein the output-amplitude-adjustment circuit is capable of adjusting the voltage of the first power source when a first gate line farther from the display driver is driven to be higher than the voltage of the first power source when a first gate line closer to the display driver is driven, and the output-amplitude-adjustment circuit is capable of adjusting the voltage of the second power source when a second gate line farther from the display driver is driven to be higher than the voltage of the second power source when a second gate line closer to the display driver is driven.

7. The display driver according to claim 1, wherein the display panel further includes a touch panel laminated on the substrate and having a plurality of touch detection lines, the display driver further comprises a plurality of receive circuits connected with the plurality of touch detection lines respectively, and each capable of detecting the amplitude of a signal on the corresponding touch detection line, and the output-amplitude-adjustment circuit is capable of adjusting the output amplitude of at least one of the group of first gate drive circuits and the group of second gate drive circuits to make smaller differences between amplitude values of signals detected by the plurality of receive circuits when the group of first gate lines are driven by the group of first gate drive circuits, and amplitude values of signals detected by the plurality of receive circuits when the group of second gate lines are driven by the group of second gate drive circuits.

8. The display driver according to claim 7, wherein the output-amplitude-adjustment circuit is capable of adjusting the output amplitude of a first gate drive circuit included in the group of first gate drive circuits to make smaller differences between signal amplitudes detected by the receive circuits when a first gate line farther from the display driver is driven, and signal amplitudes detected by the receive circuits when a first gate line closer to the display driver is driven, and the output-amplitude-adjustment circuit is capable of adjusting the output amplitude of a second gate drive circuit included in the group of second gate drive circuits so as to make smaller differences between signal amplitudes detected by the receive circuits when a second gate line farther from the display driver is driven, and signal amplitudes detected by the receive circuits when a second gate line closer to the display driver is driven.

9. The display driver according to claim 7, wherein the plurality of touch detection lines include a group of first touch detection lines wired in an up-and-down direction, and groups of second touch detection lines wired in left and right directions, and the output-amplitude-adjustment circuit is capable of adjusting the output amplitude of at least one of the group of first gate drive circuits and the group of second gate drive circuits to make smaller differences between amplitude values of signals detected by receive circuits connected with the groups of second touch detection lines when the group of first gate lines are driven by the group of the first gate drive circuits, and amplitude values of signals detected by the receive circuits connected with the groups of second touch detection lines when the group of second gate lines are driven by the group of second gate drive circuits.

10. The display driver according to claim 9, further comprising a plurality of source drive circuits operable to drive the plurality of source lines respectively, wherein the plurality of source drive circuits are capable of exercising control so as to make the plurality of source lines high impedance when the group of first gate lines are driven by the group of first gate drive circuits and when the group of second gate lines are driven by the group of second gate drive circuits.

11. The display driver according to claim 1 which is integrated on a single semiconductor substrate.

12. The display driver according to claim 2 which is integrated on a single semiconductor substrate.

13. The display driver according to claim 3 which is integrated on a single semiconductor substrate.

14. The display driver according to claim 4 which is integrated on a single semiconductor substrate.

15. The display driver according to claim 5 which is integrated on a single semiconductor substrate.

16. The display driver according to claim 6 which is integrated on a single semiconductor substrate.

17. The display driver according to claim 7 which is integrated on a single semiconductor substrate.

18. The display driver according to claim 8 which is integrated on a single semiconductor substrate.

19. The display driver according to claim 9 which is integrated on a single semiconductor substrate.

20. The display driver according to claim 10 which is integrated on a single semiconductor substrate.

21. A display device, comprising:

a display panel; and a display driver, wherein the display panel has a plurality of source lines wired to run in an up-and-down direction and a plurality of gate lines wired to run in left and right directions when viewed from a direction perpendicular to a substrate, and a plurality of pixels respectively arranged at intersections where the source and gate lines intersect with one another, wherein, in the display panel, electric charges corresponding to display data are transmitted from the source lines to the pixels selected by the driven gate line, and wherein the display driver includes an output-amplitude-adjustment circuit capable of adjusting, in output amplitude, a group of first gate drive circuits operable to drive, of the plurality of gate lines, a group of first gate lines wired from the left, and a group of second gate drive circuits operable to drive a group of second gate lines wired from the right, wherein the output-amplitude-adjustment circuit adjusts said first and second gate line groups independently of one another, and wherein the output-amplitude-adjustment circuit comprises a first register which determines a first maximum amplitude among amplitudes driven by the first gate drive circuits, and a second register which determines a second maximum amplitude among amplitudes driven by the second gate drive circuits, so as to decrease differences between first maximum amplitudes on the first gate lines which are controlled by setting a first value in the first register, and second maximum amplitudes on the second gate lines which are controlled by setting a second value in the second register.

22. The display device according to claim 21, wherein the output-amplitude-adjustment circuit makes the output amplitude of the first gate drive circuit longer in wiring length to the first gate line to be driven in the group of first gate drive circuits larger than that of the first gate drive circuit shorter in wiring length to the first gate line to be driven, and the output-amplitude-adjustment circuit makes the output amplitude of the second gate drive circuit longer in wiring length to the second gate line to be driven in the group of second gate drive circuits larger than that of the second gate drive circuit shorter in wiring length to the second gate line to be driven.

23. The display device according to claim 22, wherein the output-amplitude-adjustment circuit is capable of adjusting, based on the wiring length to the first gate line to be driven, the output amplitude of first gate drive circuits included in each of sub-groups which the group of first gate drive circuits are divided into to have a value based on the wiring length, and the output-amplitude-adjustment circuit is capable of adjusting, based on the wiring length to the second gate line to be driven, the output amplitude of second gate drive circuits included in each of sub-groups which the group of second gate drive circuits are divided into to have a value based on the wiring length.

24. The display device according to claim 22, wherein the output-amplitude-adjustment circuit is capable of successively adjusting the output amplitude of a first gate drive circuit included in the group of first gate drive circuits based on the wiring length to the first gate line to be driven, and the output-amplitude-adjustment circuit is capable of successively adjusting the output amplitude of a second gate drive circuit included in the group of second gate drive circuits based on the wiring length to the second gate line to be driven.

25. The display device according to claim 21, wherein the group of first gate drive circuits and the group of second gate drive circuits are mounted on the display panel, the display driver supplies the group of first gate drive circuits with a first power source, and the group of second gate drive circuits with a second power source, and the output-amplitude-adjustment circuit is capable of adjusting, in voltage, the first power source and the second power source independently of each other.

26. The display device according to claim 25, wherein the output-amplitude-adjustment circuit is capable of adjusting the voltage of the first power source when a first gate line farther from the display driver is driven to be higher than the voltage of the first power source when a first gate line closer to the display driver is driven, and the output-amplitude-adjustment circuit is capable of adjusting the voltage of the second power source when a second gate line farther from the display driver is driven to be higher than the voltage of the second power source when a second gate line closer to the display driver is driven.

27. The display device according to claim 21, further comprising a touch panel laminated on the display panel and having a plurality of touch detection lines, wherein the display driver further includes a plurality of receive circuits connected with the plurality of touch detection lines respectively, and each capable of detecting the amplitude of a signal on the corresponding touch detection line, and wherein the output-amplitude-adjustment circuit is capable of adjusting the output amplitude of at least one of the group of first gate drive circuits and the group of second gate drive circuits to make smaller differences between amplitude values of signals detected by the plurality of receive circuits when the group of first gate lines are driven by the group of first gate drive circuits, and amplitude values of signals detected by the plurality of receive circuits when the group of second gate lines are driven by the group of second gate drive circuits.

28. The display device according to claim 27, wherein the output-amplitude-adjustment circuit is capable of adjusting the output amplitude of a first gate drive circuit included in the group of first gate drive circuits to make smaller differences between signal amplitudes detected by the receive circuits when a first gate line farther from the display driver is driven, and signal amplitudes detected by the receive circuits when a first gate line closer to the display driver is driven, and the output-amplitude-adjustment circuit is capable of adjusting the output amplitude of a second gate drive circuit included in the group of second gate drive circuits so as to make smaller differences between signal amplitudes detected by the receive circuits when a second gate line farther from the display driver is driven, and signal amplitudes detected by the receive circuits when a second gate line closer to the display driver is driven.

29. The display device according to claim 27, wherein the plurality of touch detection lines include a group of first touch detection lines wired in an up-and-down direction, and a group of second touch detection lines wired in left and right directions, and the output-amplitude-adjustment circuit is capable of adjusting the output amplitude of at least one of the group of first gate drive circuits and the group of second gate drive circuits to make smaller differences between amplitude values of signals detected by receive circuits connected with the group of second touch detection lines when the group of first gate lines are driven by the group of the first gate drive circuits, and amplitude values of signals detected by the receive circuits connected with the group of second touch detection lines when the group of second gate lines are driven by the group of second gate drive circuits.

30. The display device according to claim 29, wherein the display driver further includes a plurality of source drive circuits operable to drive the plurality of source lines respectively, and the plurality of source drive circuits are capable of exercising control so as to make the plurality of source lines high impedance when the group of first gate lines are driven by the group of first gate drive circuits and when the group of second gate lines are driven by the group of second gate drive circuits.

* * * * *